United States Patent
Borras et al.

(10) Patent No.: US 11,225,420 B2
(45) Date of Patent: *Jan. 18, 2022

(54) REMOVAL OF MATERIALS FROM WATER

(71) Applicant: Phosphorus Free Water Solutions, LLC, Lakeland, FL (US)

(72) Inventors: Carlos Borras, Apopka, FL (US); Donald A. Luke, Valrico, FL (US)

(73) Assignee: Phosphorus Free Water Solutions, LLC, Lakeland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/249,343

(22) Filed: Feb. 26, 2021

(65) Prior Publication Data
US 2021/0188666 A1    Jun. 24, 2021

Related U.S. Application Data

(63) Continuation of application No. PCT/US2020/037405, filed on Jun. 12, 2020.
(Continued)

(51) Int. Cl.
C02F 1/461 (2006.01)
C02F 1/467 (2006.01)
(Continued)

(52) U.S. Cl.
CPC .......... *C02F 1/46176* (2013.01); *C02F 1/001* (2013.01); *C02F 1/4676* (2013.01);
(Continued)

(58) Field of Classification Search
CPC .................. C02F 1/46176; C02F 2101/105
See application file for complete search history.

(56) References Cited

U.S. PATENT DOCUMENTS 1,018,355 A * 2/1912 Porat .................. C02F 1/46176
                                                 204/248
2,449,706 A * 9/1948 Jones ................. C02F 1/46176
                                                 204/248
(Continued)

FOREIGN PATENT DOCUMENTS

CA   2953591 A1   7/2018
CN   2099752 U    3/1992
(Continued)

OTHER PUBLICATIONS

"Enpurion EC-Electrocoagulation", enpurion https://enpurion.com/empurion-ec/, (Accessed on Feb. 9, 2021), 4 pgs.
(Continued)

*Primary Examiner* — Ciel P Contreras
(74) *Attorney, Agent, or Firm* — Schwegman Lundberg & Woessner, P.A.

(57) ABSTRACT

Various embodiments relate to an electrochemical cell for removal of materials from water and methods of using the same. A method of removing phosphorus from water includes immersing an electrochemical cell in water including phosphorus to form treated water including a salt that includes the phosphorus. The electrochemical cell includes an anode including Mg, Al, Fe, Zn, or a combination thereof, a cathode including Cu, Ni, Fe, or a combination thereof. The method includes separating the salt including the phosphorus from the treated water, to form separated water having a lower phosphorus concentration than the water including phosphorus.

14 Claims, 13 Drawing Sheets

Related U.S. Application Data

(60) Provisional application No. 62/860,433, filed on Jun. 12, 2019.

(51) Int. Cl.

| | | |
|---|---|---|
| *C02F 1/52* | (2006.01) | |
| *C02F 1/58* | (2006.01) | |
| *C02F 1/66* | (2006.01) | |
| *C25B 1/50* | (2021.01) | |
| *C25B 9/65* | (2021.01) | |
| *C02F 1/00* | (2006.01) | |
| *C25B 1/00* | (2021.01) | |
| *C25B 1/20* | (2006.01) | |
| *C02F 101/10* | (2006.01) | |
| *C02F 101/16* | (2006.01) | |
| *C02F 101/20* | (2006.01) | |

(52) U.S. Cl.
CPC ............ *C02F 1/5254* (2013.01); *C02F 1/586* (2013.01); *C02F 1/66* (2013.01); *C25B 1/00* (2013.01); *C25B 1/20* (2013.01); *C25B 1/50* (2021.01); *C25B 9/65* (2021.01); *C02F 2001/46119* (2013.01); *C02F 2001/46133* (2013.01); *C02F 2101/105* (2013.01); *C02F 2101/16* (2013.01); *C02F 2101/20* (2013.01); *C02F 2209/06* (2013.01)

(56) References Cited

U.S. PATENT DOCUMENTS

| | | | |
|---|---|---|---|
| 3,660,162 A | 5/1972 | Eisenberg | |
| 4,011,151 A | 3/1977 | Ito et al. | |
| 4,655,895 A | 4/1987 | Feofanov et al. | |
| 5,167,777 A | 12/1992 | Kaczur et al. | |
| 5,876,575 A * | 3/1999 | Kump | C02F 1/46176 204/248 |
| 6,893,567 B1 | 5/2005 | Vanotti et al. | |
| 7,858,598 B2 | 12/2010 | Yang et al. | |
| 2004/0151957 A1 | 8/2004 | Brooks et al. | |
| 2004/0251212 A1 | 12/2004 | Ikematsu et al. | |
| 2005/0011765 A1* | 1/2005 | Omasa | C25B 9/17 204/633 |
| 2005/0173262 A1 | 8/2005 | Nakanishi et al. | |
| 2006/0254929 A1* | 11/2006 | Mikio | C02F 1/46176 205/742 |
| 2010/0000924 A1 | 1/2010 | Hayashi et al. | |
| 2013/0162097 A1 | 6/2013 | Shinmoto et al. | |
| 2013/0180857 A1 | 7/2013 | Heffernan et al. | |
| 2013/0220919 A1* | 8/2013 | Bilbao | C02F 1/463 210/601 |
| 2013/0277231 A1 | 10/2013 | Greenberg | |
| 2015/0001094 A1* | 1/2015 | Ibeid | C02F 3/005 205/744 |
| 2015/0151985 A1 | 6/2015 | Johnson et al. | |
| 2018/0141836 A1 | 5/2018 | Hu et al. | |
| 2020/0165149 A1 | 5/2020 | Zhu et al. | |
| 2020/0369547 A1 | 11/2020 | Davy et al. | |
| 2021/0179456 A1 | 6/2021 | Berras et al. | |

FOREIGN PATENT DOCUMENTS

| | | |
|---|---|---|
| JP | 2012011375 A | 1/2012 |
| PL | 224187 B1 | 11/2016 |
| RU | 2029735 C1 | 2/1995 |
| RU | 2142918 C1 | 12/1999 |
| WO | WO-2011107984 A2 | 9/2011 |
| WO | WO-2020252241 A1 | 12/2020 |
| WO | WO-2020252242 A1 | 12/2020 |

OTHER PUBLICATIONS

"International Application Serial No. PCT/US2020/037405, International Search Report dated Sep. 14, 2020", 2 pgs.
"International Application Serial No. PCT/US2020/037405, Written Opinion dated Sep. 14, 2020", 9 pgs.
"International Application Serial No. PCT/US2020/037407, International Search Report dated Sep. 16, 2020", 2 pgs.
"International Application Serial No. PCT/US2020/037407, Written Opinion dated Sep. 16, 2020", 8 pgs.
Al-Qodah, Zakaria, et al., "Combined electrocoagulation processes as a novel approach for enhanced pollutants removal: A state-of-the-art review", Science of the Total Environment 744, (2020), 14 pgs.
Bensadok, K, et al., "Electrocoagulation of cutting oil emulsions using aluminium plate electrodes", Journal of Hazardous Materials 152, (2008), 423-430.
Dina, T Moussa, et al., "A comprehensive review of electrocoagulation for water treatment:Potentials and challenges", Journal of Environmental Management 186, (2017), 24-41.
Gobbi, Lorena C.A., et al., "Electrocoagulation with polarity switch for fast oil removal from oil in water emulsions", Journal of Environmental Management 213, (2018), 119-125.
Govindan, Kadarkarai, et al., "Electrocoagulants Characteristics and Application of Electrocoagulation for Micropollutant Removal and Transformation Mechanism", ACS Appl Mater. Interfaces 12, (2020), 1775-1788.
Jizhou, L, et al., "Pretreatment of dyestuff wastewater by internal microelectrolysis", International Conference on Electric Technology and Civil Engineering, (2011), 4 pgs.
Kabdasli, I, et al., "Electrocoagulation applications for industrial wastewaters: a critical review", Environmental Technology Reviews, (Nov. 6, 2012), 45 pgs.
Kekedy-Nagy, Laszlo, et al., "Electroless Production of Fertilizer (Struvite) and Hydrogen from Synthetic Agricultural Wastewaters", Journal of the American Chemical Society J. Am. Chem. Soc 142, (2020), 15 pgs.
Kuokkanen, Ville, et al., "Recent Applictions of Electrocoagulation in Treatment of Water and Wastewater—A Review", Green and Sustainable Chemistry, (Jan. 2013), 34 pgs.
Luba, Mateusz, et al., "Electrochemical Degradation of Industrial Dyes in Wastewater through the Dissolution of Aluminum Sacrificial Anode of Cu/Al Macro-Corrosion Galvanic Cell", Molecules (18) 4108, (Sep. 25, 2020), 17 pgs.
Peng, Shuai, et al., "Iron-carbon galvanic cells strengthened anaerobic/anoxic/oxic process(Fe/C—A2O) for high-nitrogen/phosphorus and low-carbon sewage treatment", Science of the Total Environment 722, (2020), 13 pgs.
Pierozynski, Boguslaw, "Electrochemical Degradation of Phenol and Resorcinol Molecules through the Dissolution of Sacrificial Anodes of Macro-Corrosion Galvanic Cells", Water 10:770, (2018), 10 pgs.
"U.S. Appl. No. 17/249,345, Non Final Office Action dated Jun. 24, 2021", 26 pgs.
"U.S. Appl. No. 17/249,345, Response filed Jun. 7, 2021 to Restriction Requirement dated May 3, 2021", 11 pgs.
"U.S. Appl. No. 17/249,345, Restriction Requirement dated May 3, 2021", 8 pgs.
"U.S. Appl. No. 17/249,345, Response filed Sep. 7, 2021 to Non Final Office Action dated Jun. 24, 2021", 19 pgs.
"U.S. Appl. No. 17/340,254, Non Final Office Action dated Sep. 23, 2021", 10 pgs.
"U.S. Appl. No. 17/249,345, Notice of Allowance dated Sep. 27, 2021", 12 pgs.
"U.S. Appl. No. 17/340,254, Response filed Nov. 4, 2021 to Non Final Office Action dated Sep. 23, 2021", 15 pgs.
"U.S. Appl. No. 17/340,254, Final Office Action dated Nov. 19, 2021", 10 pgs.

\* cited by examiner

REMOVAL OF MATERIALS FROM WATER

CROSS-REFERENCE TO RELATED APPLICATION

This application is a continuation of International Application No. PCT/US2020/037405, filed Jun. 12, 2020, which claims the benefit of priority to U.S. Provisional Patent Application Ser. No. 62/860,433 filed Jun. 12, 2019, the disclosure of each of which is incorporated herein in their entireties by reference.

BACKGROUND

Phosphorus is a common constituent of agricultural fertilizers, manure, and organic wastes in sewage and industrial effluent. It is an essential element for plant life, but when there is too much of it in water, it can cause growth of plants and algae and deplete oxygen from the water at a rate that is greater than ecosystems can handle and can have severe ecological effects including toxic algae blooms, death of native aquatic species, and loss of biodiversity (eutrophication). Although various methods for removal of phosphorus from water are available, existing methods can be expensive, inconvenient, inefficient, lack scalability, or can be environmentally unfriendly.

SUMMARY OF THE INVENTION

Various embodiments of the present invention provide a method of removing phosphorus from water. The method includes immersing an electrochemical cell in water including phosphorus to form treated water including a salt that includes the phosphorus. The electrochemical cell includes an anode including Mg, Al, Fe, Zn, or a combination thereof, a cathode having a different composition than the anode, the cathode including Cu, Ni, Fe, or a combination thereof. The method also includes separating the salt including the phosphorus from the treated water, to form separated water having a lower phosphorus concentration than the water including phosphorus.

Various embodiments of the present invention provide a method of removing phosphorus from water. The method includes immersing an electrochemical cell in water including phosphorus having a pH of about 5 to about 7 to form treated water including a salt that includes the phosphorus. The salt that includes the phosphorus includes $AlPO_4$ or a hydrate thereof, the $AlPO_4$ including the phosphorus and Al from the anode; aluminum hydroxide or a hydrate thereof, the aluminum hydroxide including Al from the anode; or a combination thereof. The electrochemical cell includes an anode including Al, wherein the anode is about 90 wt % to about 100 wt % Al. The electrochemical cell includes a cathode including Cu, wherein the cathode is about 90 wt % to about 100 wt % Cu. The electrochemical cell also includes a conductive connector that electrically connects the anode and the cathode, the conductive connector including an alloy including Cu and Zn. The method also includes separating the salt including the phosphorus from the treated water, to form separated water having a lower phosphorus concentration than the water including phosphorus.

Various embodiments of the present invention provide a method of removing phosphorus from water. The method includes immersing an electrochemical cell in water including phosphorus having a pH of about 10 to about 11 to form treated water including a salt that includes the phosphorus. The salt that includes the phosphorus includes magnesium phosphate, magnesium potassium phosphate, a hydrate thereof, or a combination thereof, $NH_4MgPO_4$ or a hydrate thereof, the $NH_4MgPO_4$ including the phosphorus and Mg from the anode; $Mg(OH)_2$ including Mg from the anode; or a combination thereof. The electrochemical cell includes an anode including Mg, wherein the anode is about 90 wt % to about 100 wt % Mg. The electrochemical cell includes a cathode including Cu, wherein the cathode is about 90 wt % to about 100 wt % Cu. The electrochemical cell also includes a conductive connector that electrically connects the anode and the cathode, the conductive connector including an alloy including Cu and Zn. The method also includes separating the salt including the phosphorus from the treated water, to form separated water having a lower phosphorus concentration than the water including phosphorus.

Various embodiments of the present invention provide an electrochemical cell for performing embodiments of the method described herein. The electrochemical cell includes a cathode including Cu, Ni, Fe, or a combination thereof, wherein the cathode includes a planar frame of the electrochemical cell having a polygonal perimeter and a porous material included within the perimeter of the frame that is a wire mesh or a wire screen that is in direct contact with the frame. The electrochemical cell also includes a plurality of anodes having a different composition than the cathode, the anodes including Mg, Al, Fe, Zn, or a combination thereof, and a plurality of conductive connectors that electrically connect the anode and the cathode, the conductive connector including Cu, Zn, Fe, Cd, Ni, Sn, Pb, or a combination thereof. Each anode is a strip fastened to the planar frame at two opposite edges of the planar frame on a face of the frame, wherein each of the anodes is fastened to the planar frame with at least one of the conductive connectors at each of the two edges of the planar frame, such that each of the anodes on the face are approximately parallel to one another on the face and span across the porous material included within the perimeter of the planar frame forming a gap between the porous material included within the perimeter of the planar frame and the anode strip. Each anode directly contacts the cathode frame at each of the edges of the planar frame where the anode is fastened to the planar frame via the at least one conductive connector. The plurality of the anodes are spaced-apart across the face of the such that they do not physically contact one another. The gap is about 1 mm to about 110 mm.

Various embodiments of the present invention provide a method of making struvite. The method includes immersing an electrochemical cell in water including phosphorus having a pH of about 10 to about 11 to form treated water including a salt that includes the phosphorus. The salt that includes the phosphorus includes struvite, the struvite including the phosphorus and Mg from the anode. The electrochemical cell includes an anode including Mg, wherein the anode is about 90 wt % to about 100 wt % Mg. The electrochemical cell includes a cathode including Cu, wherein the cathode is about 90 wt % to about 100 wt % Cu. The method also includes separating the salt including the phosphorus from the treated water to obtain separated struvite and to form separated water having a lower phosphorus concentration than the water including phosphorus.

Various embodiments of the present invention provide a method of making $AlPO_4$, aluminum hydroxide, or a combination thereof. The method includes immersing an electrochemical cell in water including phosphorus having a pH of about 5 to about 7 to form treated water including a salt that includes the phosphorus. The salt that includes the phosphorus includes $AlPO_4$ or a hydrate thereof, the $AlPO_4$ including the phosphorus and Al from the anode; aluminum hydroxide or a hydrate thereof, the aluminum hydroxide including Al from the anode; or a combination thereof. The electrochemical cell includes an anode including Al, wherein the anode is about 90 wt % to about 100 wt % Al. The electrochemical cell includes a cathode including Cu, wherein the cathode is about 90 wt % to about 100 wt % Cu. The method includes separating the salt including the phosphorus from the treated water, to form separated water having a lower phosphorus concentration than the water including phosphorus.

Various embodiments of the present invention provide a method of making magnesium phosphate, $Mg(OH)_2$, or a combination thereof. The method includes immersing an electrochemical cell in water including phosphorus having a pH of about 10 to about 11 to form treated water including a salt that includes the phosphorus. The salt includes magnesium phosphate, magnesium potassium phosphate, a hydrate thereof, or a combination thereof, $Mg(OH)_2$ including Mg from the anode; or a combination thereof. The electrochemical cell includes an anode including Mg, wherein the anode is about 90 wt % to about 100 wt % Mg. The electrochemical cell includes a cathode including Cu, wherein the cathode is about 90 wt % to about 100 wt % Cu. The method also includes separating the salt including the phosphorus from the treated water, to form separated water having a lower phosphorus concentration than the water including phosphorus.

Various embodiments of the present invention provide a method of removing one or more dissolved transition metals, post-transition metals, or metalloids from water. The method includes immersing an electrochemical cell in water including the one or more dissolved transition metals, post-transition metals, or metalloids to form treated water including a hydroxide salt that includes the one or more transition metals, post-transition metals, or metalloids. The electrochemical cell includes an anode including Mg, Al, Fe, Zn, or a combination thereof. The electrochemical cell includes a cathode including Cu, Ni, Fe, or a combination thereof. The method also includes separating the salt including the hydroxide salt that includes the one or more transition metals, post-transition metals, or metalloids, to form separated water having a lower concentration of the one or more transition metals, post-transition metals, or metalloids than the water including the one or more transition metals, post-transition metals, or metalloids.

In various embodiments, the method of phosphorus removal of the present invention has certain advantages over other methods of removal phosphorus from water. For example, in some embodiments, the method of phosphorus removal of the present invention can remove a larger amount of phosphorus, accomplish a lower concentration of phosphorus, achieve phosphorus removal with greater efficiency or less cost, utilize a smaller footprint, or a combination thereof, as compared to other methods.

In various embodiments, the method of phosphorus removal of the present invention can be performed with less oxidation of incoming water as compared to other methods, or with no oxidation of incoming water. In some embodiments that include an electrochemical cell including an anode that includes Al, a higher pH near that anode from production of hydroxide ions can induce or enhance precipitation of the aluminum salt (e.g., $AlPO_4$, aluminum hydroxide, or a combination thereof). In some embodiments, the ratio of Al to P used to remove the phosphorus from the water is lower than those reported by other methods, such as methods using an addition of an aluminum salt.

BRIEF DESCRIPTION OF THE FIGURES

The drawings illustrate generally, by way of example, but not by way of limitation, various embodiments of the present invention.

DETAILED DESCRIPTION OF THE INVENTION

Figure 1A:
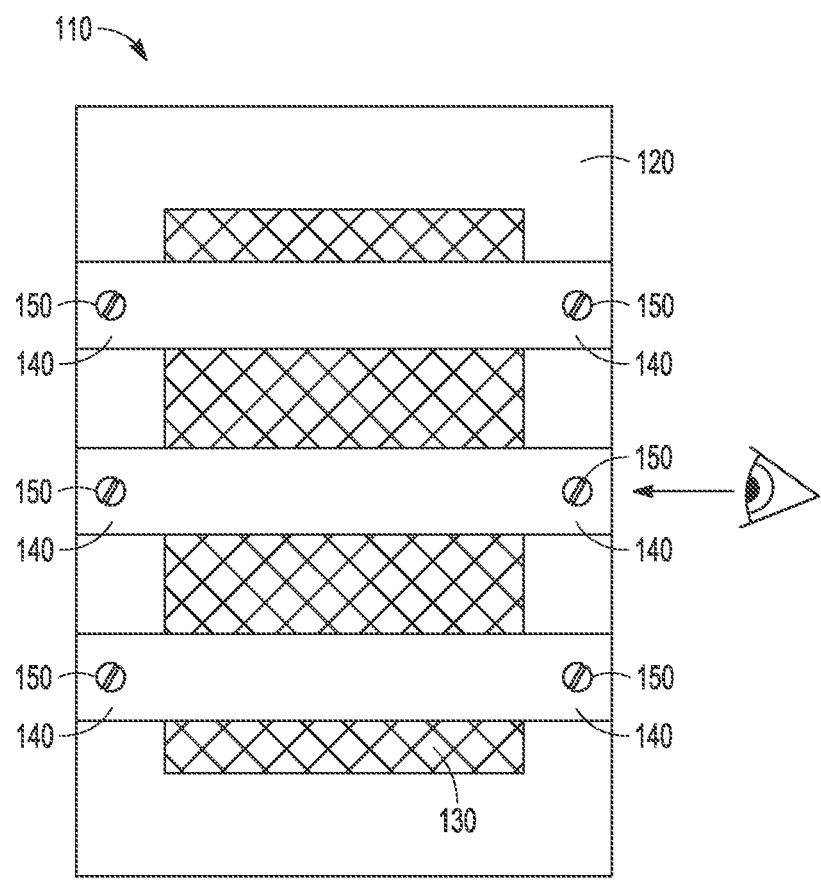
FIG. 1A illustrates an electrochemical cell view from a major face, in accordance with various embodiments.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range. The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about 5 wt % or less, or less than or equal to about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

All concentrations of phosphorus, magnesium, and aluminum referred to are dissolved concentrations of these materials in elemental or non-elemental (e.g., as a compound or ion including the material) forms, unless otherwise indicated. All concentrations given herein are by weight unless otherwise indicated.

As used herein, "total phosphorus concentration" refers to the concentration of all forms of phosphorus, as measured by US-EPA 365.1: Determination of Phosphorus by Semi-Automated Colorimetry or equivalent, unless otherwise indicated.

As used herein, "dissolved phosphorus concentration" refers to the concentration of all forms of phosphorus passable though a 0.45 micron filter and as measured by US-EPA 365.1: Determination of Phosphorus by Semi-Automated Colorimetry or equivalent, unless otherwise indicated.

As used herein, "reactive phosphorus concentration" refers to the soluble reactive phosphorus in solution (e.g., orthophosphate) as measured by US-EPA 365.1: Determination of Phosphorus by Semi-Automated Colorimetry or equivalent unless otherwise indicated.

Method of Removing Phosphorus from Water.

In various embodiments, the present invention provides a method of removing phosphorus from water. The phosphorus can be removed in the form of a salt including the phosphorus using an electrochemical cell (e.g., one or more electrochemical cells). The method can include immersing an electrochemical cell in water including phosphorus to form treated water including a salt that includes the phosphorus. The electrochemical cell can include an anode including Mg, Al, Fe, Zn, or a combination thereof. The electrochemical cell can include a cathode including Cu, Ni, Fe, or a combination thereof. The method can also include separating the salt including the phosphorus from the treated water, to form separated water having a lower phosphorus concentration than the water including phosphorus. In some embodiments, the electrochemical cell can also include a conductive connector that electrically connects the anode and the cathode, the conductive connector including Cu, Zn, Fe, Cd, Ni, Sn, Pb, or a combination thereof. In some embodiments, the anode and the cathode can directly contact one another and the electrochemical cell can be free of the conductive connectors.

The electrochemical cell can be a galvanic cell. The method can be free of applying electrical potential (e.g., applied potential from a source external to the electrochemical cell) across the anode and the cathode of the electrochemical cell. In some embodiments, the electrochemical cell can be an electrolytic cell. The method can include applying an electrical potential across the anode and the cathode of the electrochemical cell. The applied potential can be greater than the galvanic corrosion potential of the electrochemical cell (e.g., the potential the anode and cathode reach with no external potential applied thereto when immersed in the water including phosphorus). The applied potential can be less than the galvanic corrosion potential of the electrochemical cell. The applied potential can be equal to the galvanic corrosion potential of the electrochemical cell.

The method can include immersing an electrochemical cell in water including phosphorus. The immersing of the electrochemical cell in the water including phosphorus can include partial immersion, such that any suitable proportion of the surface area of the electrochemical cell is in contact with the water, such as about 1% to about 100%, 80% to about 100%, or less than, equal to, or greater than about 1%, 10, 20, 30, 40, 50, 60, 70, 80, 90, 95, 96, 97, 98, or about 99% or more. The immersing of the electrochemical cell in the water including phosphorus can include complete immersion, such that about 100% of the surface area of the electrochemical cell is in contact with the water.

The water including phosphorus can be taken from any suitable source. For example, the water including phosphorus can be taken from a source including a natural source of water in the environment, drinking water (e.g., for removal of struvite to prevent formation in pipes), industrial wastewater, industrial cooling water, or a combination thereof. The water including phosphorus can be water taken from a source including a natural source of water in the environment, such as a pond, lake, river, stream, and the like. In some embodiments, the method can include taking the water from the source, returning the water to the source after removal of phosphorus, or a combination thereof.

The phosphorus in the water including the phosphorus can be in any suitable form. For example, the phosphorus can be in the form of elemental phosphorus, inorganic phosphorus, organic phosphorus, a dissolved form of phosphorus, a solid form of phosphorus, oxidized phosphorus, or a combination thereof. The water including the phosphorus can have a total phosphorus concentration, a dissolved phosphorus concentration, a reactive phosphorus concentration, or a combination thereof, of about 0.001 ppm to about 10,000 ppm, about 0.01 ppm to about 20 ppm, or about 0.001 ppm or less, or less than, equal to, or greater than about 0.005 ppm, 0.01, 0.02, 0.04, 0.06, 0.08, 0.1, 0.15, 0.2, 0.4, 0.6, 0.8, 1, 2, 4, 6, 8, 10, 15, 20, 40, 60, 80, 100, 150, 200, 400, 600, 800, 1,000, 1,500, 2,000, 4,000, 6,000, 8,000, or about 10,000 ppm or more.

The separated water can have a total phosphorus concentration, a dissolved phosphorus concentration, a reactive phosphorus concentration, or a combination thereof, of about 0 ppm to about 1 ppm, about 0.0001 ppm to 0.1 ppm, about 0.0001 ppm to 0.05 ppm, or about 0 ppm, or less than, equal to, or greater than about 0.0001 ppm, 0.0002, 0.0004, 0.0006, 0.0008, 0.0010, 0.0012, 0.0014, 0.0016, 0.0018, 0.0020, 0.0022, 0.0024, 0.0026, 0.0028, 0.0030, 0.0032, 0.0034, 0.0036, 0.0038, 0.0040, 0.0045, 0.0050, 0.0060, 0.0080, 0.01, 0.02, 0.04, 0.06, 0.08, 0.1, 0.2, 0.4, 0.6, 0.8, or about 1.0 ppm or more. The separated water can have a total phosphorus concentration, a dissolved phosphorus concentration, a reactive phosphorus concentration, or a combination thereof, that is about 0% to 70% of the respective total phosphorus concentration, a dissolved phosphorus concentration, a reactive phosphorus concentration, or a combination thereof, of the water including the phosphorus that is initially contacted with the electrochemical cell, or about 0% to about 20%, or about 0%, or less than, equal to, or greater than about 0.001%, 0.005, 0.01, 0.05, 0.1, 0.5, 1, 2, 4, 6, 8, 10, 15, 20, 25, 30, 35, 40, 45, 50, 55, 60, 65, or about 70% or more.

During the immersing of the electrochemical cell in the water including the phosphorus, the water including phosphorus can have any suitable pH. The pH can be about 2 to about 14, about 5 to about 11, about 5 to about 7, about 10 to about 11, or less then, equal to, or greater than about 2, 2.5, 3, 3.5, 4, 4.5, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.5, 8, 8.5, 9, 9.5, 10, 10.1, 10.2, 10.3, 10.4, 10.5, 10.6, 10.7, 10.8, 10.9, 11, 11.5, 12, 12.5, 13, 13.5, or about 14 or more.

The method can include adding acid, base, or a combination thereof to the water including phosphorus to adjust or control the pH thereof. In some embodiments, the method is free of adding acid, base, or a combination thereof to the water including phosphorus. The acid, base, or combination thereof can be added to the water including phosphorus before the immersing of the electrochemical cell in the water including phosphorus, during the immersing of the electrochemical cell in the water including phosphorus, after the immersing of the electrochemical cell in the water including phosphorus, or a combination thereof.

The method can include recirculating the water including phosphorus that immerses the electrochemical cell to contact the water including phosphorus with the electrochemical cell multiple times. The water can optionally be filtered during the recirculation, such as to remove salt including phosphorus from the water.

Immersing an electrochemical cell in water including phosphorus can form treated water including a salt that includes the phosphorus. Contact between the water including the phosphorus and the electrochemical cell can cause formation of the salt that includes the phosphorus. At least some of the salt including the phosphorus in the treated water can include a solid. Formation of the solid including the phosphorus can include precipitation, flocculation, or a combination thereof.

Separating the salt including the phosphorus from the treated water, to form separated water having a lower phosphorus concentration than the water including phosphorus, can be performed in any suitable way. The separating can include decantation, settling, filtration, or a combination thereof. The separating can include separating the treated water from the electrochemical cell (e.g., removing water immersing the cell that has been filtered or from which the salt including the phosphorus has otherwise been separated). The separation can occur during a recirculation of the water back to the electrochemical cell. The separation can be performed during the contacting the electrochemical cell with the water, such as via a filter that is immersed in the water and is continuously filtering the water during the contacting. The separation can occur after the water is removed from the water that immerses the electrochemical cell, such as via a filter on an exit line out of the system. The filtration can be conducted using a glass frit, a fabric filter, a paper filter, a disk filter, a rotary filter, a drum filter, a screen, a sieve, particulate filtration media, a filter aid, or a combination thereof. The separated water can be optionally further treated, such as via further contact with the same or different electrochemical cell, filtration, treatment to remove one or more other non-phosphorus materials, pH adjusted, or a combination thereof.

The anode can be a sacrificial anode that is consumed during treatment of the water including the phosphorus. The salt including the phosphorus that is formed upon contact of the water including the phosphorus with the electrochemical cell can include a material from the anode. The method can include forming a hydroxide salt including a material from the anode during the immersing of the electrochemical cell in the water including phosphorus. Separating the salt including the phosphorus from the treated water can further include separating the hydroxide salt including the material from the anode from the treated water.

The water including phosphorus can further include a dissolved transition metal, post-transition metal, metalloid, or a combination thereof. The method can include forming a hydroxide salt including the transition metal, post-transition metal, or metalloid during the immersing of the electrochemical cell in the water including phosphorus. Separating of the salt including the phosphorus from the treated water can include separating the hydroxide salt including the transition metal, post-transition metal, or metalloid from the treated water. The transition metal, post-transition metal, or metalloid can be Sc, Y, Ti, V, Cr, Mn, Fe, Co, Ni, Cu, Zr, Nb, Mo, Tc, Ru, Rh, Pd, Ag, Hf, Ta, W, Re, Os, Ir, Pt, Au, Rf, Db, Sg, Bh, Hs, Al, Zn, Ga, Cd, In, Sn, Hg, Tl, Pb, Bi, Po, Cn, B, Si, Ge, As, Sb, Te, At, or a combination thereof. The transition metal, post-transition metal, or metalloid can be Hg, Fe, Cr, Ni, Zn, Cd, As, or a combination thereof. The method can remove any suitable amount of the transition metal, post-transition metal, metalloid, or combination thereof from the water. The separated water can have a concentration of the transition metal, post-transition metal, metalloid, or combination thereof, that is about 0% to about 70% of a concentration of the transition metal, post-transition metal, metalloid, or combination thereof, in the water including the one or more dissolved transition metals, post-transition metals, or metalloids, or about 0% to about 20%, or about 0%, or about 1% or less, or less than, equal to, or greater than about 2%, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, or about 70% or more of a concentration of the transition metal, post-transition metal, metalloid, or combination thereof, in the water including the one or more dissolved transition metals, post-transition metals, or metalloids.

The method can include forming $H_2$ and $HO^-$ at the anode (e.g., generate on the surface of the anode, from water) during the immersing of the electrochemical cell in the water including phosphorus. The method can include forming $H_2$ and $HO^-$ at the cathode (e.g., generate on the surface of the cathode, from water) during the immersing of the electrochemical cell in the water including phosphorus. The method can include forming $H_2O_2$, $HO_2^-$, or a combination thereof at the cathode (e.g., generate on the surface of the cathode) during the immersing of the electrochemical cell in the water including phosphorus. The method can include applying shear to the water including the phosphorus during the immersing of the electrochemical cell in the water including phosphorus. The shear can be sufficient to dislodge at least some bubbles (e.g., including $H_2$) from the surface of the anode, cathode, or a combination thereof. The shear can be sufficient to at least partially prevent or reduce oxide formation at the surface of the anode. The method can include applying a mechanical force to the electrochemical cell immersed in the water including phosphorus, such as a rapping, knocking, agitating, vibration, ultrasound, and the like. The mechanical force can be sufficient to dislodge at least some bubbles including $H_2$ from the surface of the anode, cathode, or a combination thereof; at least partially prevent oxide formation at the surface of the anode; at least partially prevent agglomeration of the salt including the phosphorus on the surface of the anode; or a combination thereof.

The water including phosphorus can further include nitrogen. The nitrogen in the water including phosphorus can be in any suitable form, such as in the form of elemental nitrogen, inorganic nitrogen, organic nitrogen, a dissolved form of nitrogen, a solid form of nitrogen, oxidized nitrogen, or a combination thereof. The total nitrogen concentration, dissolved nitrogen concentration, or a combination thereof, of the water including phosphorus can be about 0.001 ppm to about 20 ppm, about 1 ppm to about 5 ppm, or about 0.001 ppm or less, or less than, equal to, or greater than about 0.005 ppm, 0.01, 0.02, 0.04, 0.06, 0.08, 0.1, 0.15, 0.2, 0.4, 0.6, 0.8, 1, 2, 4, 6, 8, 10, 12, 14, 16, 18, or about 20 ppm or more. The separated water can have a total nitrogen concentration, a dissolved nitrogen concentration, or a combination thereof, of about 0 ppm to about 2 ppm, about 0 ppm to about 1 ppm, or about 0 ppm, or less than, equal to, or greater than 0.001 ppm, 0.0012, 0.0014, 0.0016, 0.0018, 0.0020, 0.0022, 0.0024, 0.0026, 0.0028, 0.0030, 0.0032, 0.0034, 0.0036, 0.0038, 0.0040, 0.0045, 0.0050, 0.0060, 0.0080, 0.01, 0.02, 0.04, 0.06, 0.08, 0.1, 0.2, 0.4, 0.6, 0.8, 1, 1.1, 1.2, 1.4, 1.6, 1.8, or about 2 ppm or more. The separated water can have a total nitrogen concentration, a dissolved nitrogen concentration, or a combination thereof, that is about 0% to about 70% of the respective total nitrogen concentration, dissolved nitrogen concentration, or a combination thereof, of the water including phosphorus, or about 0% to about 30%, or about 0%, or less than, equal to, or greater than about 0.001%, 0.005, 0.01, 0.05, 0.1, 0.5, 1, 2, 4, 6, 8, 10, 15, 20, 25, 30, 35, 40, 45, 50, 55, 60, 65, or about 70% or more.

The method can further include forming $NH_3$, $NH_4^+$, or a combination thereof, at the cathode (e.g., at the surface of the cathode), wherein the $NH_3$ and $NH_4^+$ include the nitrogen from the water including phosphorus. The method can include forming a salt including the nitrogen during the immersing of the electrochemical cell in the water including phosphorus. The separating of the salt including the phosphorus from the treated water can include separating the salt including the nitrogen from the treated water. The salt including the nitrogen can include $NH_4MgPO_4$ or a hydrate thereof (e.g., struvite).

The cathode of the electrochemical cell can include Cu, Ni, Fe, or a combination thereof, such as Cu or a Cu alloy. The cathode can be a solid material that is predominantly Cu, Ni, Fe, alloys thereof, or a combination thereof, or another material that is coated with predominantly Cu, Ni, Fe, alloys thereof, or a combination thereof. The cathode can be substantially free of materials other than Cu, Ni, Fe, alloys thereof, or a combination thereof. The cathode can be about 50 wt % to about 100 wt % Cu, Ni, Fe, alloys thereof, or a combination thereof, about 90 wt % to about 100 wt %, or less than, equal to, or greater than about 50 wt %, 55, 60, 65, 70, 75, 80, 82, 84, 86, 88, 90, 91, 92, 93, 94, 95, 96, 97, 98, 99, 99.5, 99.9, 99.99, or about 99.999 wt % or more. In some embodiments, the cathode includes Cu and the anode includes Mg. In some embodiments, the cathode includes Cu and the anode includes Al.

The anode can be a solid material of approximately homogeneous composition or can be a coating on another material. The anode has a different composition than the cathode. The anode can include Mg, Al, Fe, Zn, or a combination thereof. The anode can include an alloy that includes Mg, Al, Fe, Zn, or an alloy thereof. The Mg, Al, Fe, Zn, alloys thereof, or combinations thereof, can be about 50 wt % to about 100 wt % of the anode, or less than, equal to, or greater than about 50 wt %, 55, 60, 65, 70, 75, 80, 85, 90, 91, 92, 93, 94, 95, 96, 97, 98, or about 99, 99.5, 99.9, 99.99, or about 99.999 wt % or more. The anode can be substantially free of materials other than Mg, Al, Fe, Zn, alloys thereof, or combinations thereof.

The anode can further include Ag, Pt, Au, or a combination thereof. The Ag, Pt, Au, or the combination thereof is about 0.0001 wt % to about 20 wt %, about 0.0001 wt % to about 5 wt %, or about 0 wt %, or about 0.0001 wt % or less, or 0.0002, 0.0004, 0.0006, 0.0008, 0.0010, 0.0012, 0.0014, 0.0016, 0.0018, 0.0020, 0.0022, 0.0024, 0.0026, 0.0028, 0.0030, 0.0032, 0.0034, 0.0036, 0.0038, 0.0040, 0.0045, 0.0050, 0.0060, 0.0080, 0.01, 0.02, 0.04, 0.06, 0.08, 0.1, 0.2, 0.4, 0.6, 0.8, 1, 1.5, 2, 4, 6, 8, 10, 12, 14, 16, 18, or about 20 wt % or more.

The anode can include Mg or an Mg alloy. The anode can be substantially free of materials other than Mg or alloys thereof. The anode can be magnesium alloy AZ91 that is about 90 wt % Mg, about 9 wt % Al, and about 1 wt % Zn. The anode can be about 50 wt % to about 100 wt % Mg or Mg alloy, about 90 wt % to about 100 wt % Mg or Mg alloy, or less than, equal to, or greater than about 50 wt %, 55, 60, 65, 70, 75, 80, 85, 90, 91, 92, 93, 94, 95, 96, 97, 98, 99, 99.5, 99.9, 99.99, or about 99.999 wt % Mg or Mg alloy or more. The salt including the phosphorus can include magnesium phosphate, magnesium potassium phosphate (e.g., "K-struvite"), a hydrate thereof, or a combination thereof, wherein the magnesium phosphate or magnesium potassium phosphate includes Mg from the anode. The magnesium phosphate can be in any suitable form, such as monomagnesium phosphate ($Mg(H_2PO_4)_2$), dimagnesium phosphate ($MgHPO_4$), trimagnesium phosphate ($Mg_3(PO_4)_2$), a hydrate thereof, or a combination thereof. The separating of the salt including the phosphorus from the treated water can include separating the magnesium phosphate from the treated water. The water including phosphorus can further includes nitrogen, wherein the salt including the phosphorus includes $NH_4MgPO_4$ or a hydrate thereof (e.g., struvite), with the $NH_4MgPO_4$ including the phosphorus and Mg from the anode. The method can include forming $Mg(OH)_2$ including Mg from the anode during the immersing of the electrochemical cell in the water including phosphorus. The separating of the salt including the phosphorus from the treated water can include separating the $Mg(OH)_2$ from the treated water. During the immersing of the electrochemical cell in the water including the phosphorus, the water including the phosphorus can have a pH of about 9.5 to about 11.5, or about 10 to about 11, or less than, equal to, or greater than 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, or about 11.5 or more. The method can include regulating a rate of introduction of fresh water including the phosphorus to the electrochemical cell such that the water including the phosphorus that immerses the electrochemical cell is maintaining at a pH of about 9.5 to about 11.5, or about 10 to about 11, or less than, equal to, or greater than 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, or about 11.5 or more. The method can include immersing the electrochemical cell in the water including the phosphorus until the water including the phosphorus reaches a pH of about 9.5 to about 11.5 or about 10 to about 11, and then regulating a rate of introduction of fresh water including the phosphorus to the electrochemical cell such that the water including the phosphorus that immerses the electrochemical cell is maintained at a pH of about 9.5 to about 11.5 or about 10 to about 11.

The anode can include Al. The anode can be substantially free of materials other than Al. The anode can be about 50 wt % to about 100 wt % Al, about 90 wt % to about 100 wt % Al, or less than, equal to, or greater than about 50 wt %, 55, 60, 65, 70, 75, 80, 85, 90, 91, 92, 93, 94, 95, 96, 97, 98, or about 99, 99.5, 99.9, 99.99, or about 99.999 wt % or more. The salt including phosphorus can include $AlPO_4$ or a hydrate thereof. Separating of the salt including the phosphorus from the treated water can include separating the $AlPO_4$ from the treated water. The method can include forming aluminum hydroxide or a hydrate thereof (e.g., $Al(OH)_3$ or polyaluminum hydroxide), the aluminum hydroxide including Al from the anode during the immersing of the electrochemical cell in the water including phosphorus. Separating of the salt including the phosphorus from the treated water can include separating the aluminum hydroxide from the treated water. During the immersing of the electrochemical cell in the water including the phosphorus, the water including phosphorus has a pH of about 4 to about 8, about 5 to about 7, or about 4 or less, or about 4.2, 4.4, 4.6, 4.8, 5, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7, 7.2, 7.4, 7.6, 7.8, or about 8 or more. The method can include regulating a rate of introduction of an acid to the water including the phosphorus such that the water including the phosphorus that immerses the electrochemical cell is maintained at a pH of about 4 to about 8, about 5 to about 7, or about 4 or less, or about 4.2, 4.4, 4.6, 4.8, 5, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7, 7.2, 7.4, 7.6, 7.8, or about 8 or more. The acid can be added to the water including the phosphorus prior to the immersion of the electrochemical cell in the water including the phosphorus, during the immersion of the electrochemical cell in the water including the phosphorus, after the immersion of the electrochemical cell in the water including the phosphorus, or a combination thereof. The acid can be any suitable acid, at any suitable concentration. The acid can include sulfuric acid, acetic acid, hydrochloric acid, or a combination thereof. The method can include flocculating salts that include Al from the treated water.

The cathode can have a work function that is larger than the work function of the anode. For example, Cu has a work function of about 4.53-5.10 eV, Mg has a work function of about 3.66 eV, and Al has a work function of about 4.06-4.26 eV. The conductive connector can have a work function that is between the work function of the cathode and the work function of the cathode.

The electrochemical cell can include a conductive connector that electrically connects the anode and the cathode. The conductive connector has a different composition than the anode or the cathode. The conductive connector can be a solid material with a homogeneous composition or can be a coating on another material. The conductive connector can include Cu, Zn, Fe, Cd, Ni, Sn, Pb, or a combination thereof. The conductive connector can include Cu. The conductive connector can include Zn. The conductive connector can include an alloy including Cu and Zn. The conductive connector can include brass. The conductive connector can include brass, and can be substantially free of other materials. The conductive connector can be about 50 wt % to about 100 wt % brass, about 90 wt % to about 100 wt %, or less than, equal to, or greater than about 50 wt %, 55, 60, 65, 70, 75, 80, 85, 90, 91, 92, 93, 94, 95, 96, 97, 98, or about 99, 99.5, 99.9, 99.99, or about 99.999 wt % or more.

The water including the phosphorus can have any suitable conductivity during immersion of the electrochemical cell in the water including the phosphorus, such as about 100 µS to about 1,000,000 µS, or about 300 µS to about 100,000 µS, or about 100 µS to about 1,200 µS, or less than, equal to, or greater than about 100 µS, 200, 300, 400, 500, 600, 700, 800, 900, 1,000, 1,100, 1,200, 1,500, 2,000, 4,000, 6,000, 10,000, 15,000, 20,000, 50,000, 100,000, 150,000, 200,000, 250,000, 500,000, 750,000, or about 1,000,000 µS or more. The method can be free of regulation of the conductivity of the water including the phosphorus. In some embodiments, the method can include regulating the conductivity of the water including phosphorus such that the conductivity is maintained at about 100 µS to about 1,000,000 µS, or about 300 µS to about 100,000 µS, or about 100 µS to about 1,200 µS, or less than, equal to, or greater than about 100 µS, 200, 300, 400, 500, 600, 700, 800, 900, 1,000, 1,100, 1,200, 1,500, 2,000, 4,000, 6,000, 10,000, 15,000, 20,000, 50,000, 100,000, 150,000, 200,000, 250,000, 500,000, 750,000, or about 1,000,000 µS or more. Regulating the conductivity of the water including the phosphorus can include regulating a rate of introduction of fresh water including the phosphorus to the electrochemical cell. Regulating the conductivity of the water including the phosphorus can include adding one or more salts to the water including the phosphorus. The salt can be added to the water including the phosphorus before immersing the electrochemical cell in the water including phosphorus, during the immersion of the electrochemical cell in the water including phosphorus, after the immersion of the electrochemical cell in the water including phosphorus, or a combination thereof. The one or more salts added to the water including phosphorus to regulate the conductivity thereof can include halogen salts, sodium salts, potassium salts, or a combination thereof. The one or more salts added to the water including phosphorus to regulate the conductivity thereof can include sodium chloride.

The electrochemical cell can generate a current when immersed in the water including the phosphorus. The amount of current generated by the electrical cell can be any suitable amount of current, such as about 0.001 mA/cm² to about 10 mA/cm², 0.01 mA/cm² to about 0.5 mA mA/cm², or less than, equal to, or greater than about 0.001 mA/cm², 0.005, 0.01, 0.015, 0.02, 0.025, 0.03, 0.035, 0.04, 0.045, 0.05, 0.06, 0.07, 0.08, 0.09, 0.1, 0.15, 0.2, 0.25, 0.3, 0.35, 0.4, 0.45, 0.5, 0.6, 0.7, 0.8, 0.9, 1, 1.2, 1.5, 2, 2.5, 3, 4, 5, 6, 7, 8, 9, or about 10 mA/cm² or more.

The immersing of the electrochemical cell in the water including the phosphorus can be sufficient to oxidize the phosphorus in the water including the phosphorus. The method can be free of treating the water including the phosphorus with an oxidizer or an oxidative treatment other than any oxidation that occurs due to immersion of the electrochemical cell in the water including the phosphorus. In some embodiments, the method includes oxidizing phosphorus in the water including the phosphorus prior to the immersion of the electrochemical cell in the water including phosphorus, during the immersion of the electrochemical cell in the water including phosphorus, or a combination thereof. The method can include oxidizing phosphorus in the water including the phosphorus prior to the immersion of the electrochemical cell in the water including phosphorus. Oxidizing the phosphorus in the water including the phosphorus can include contacting an oxidizer and the water including phosphorus to oxidize the phosphorus (e.g., to oxidize phosphorus in organic matter or solid matter that contains phosphorus). An aqueous solution of the oxidizer can be added to the water including phosphorus. The aqueous solution of the oxidizer has a concentration of the oxidizer of about 0.001 ppm to about 999,999 ppm, about 50,000 ppm to about 140,000 ppm, or less than, equal to, or greater than about 0.001 ppm, 0.005, 0.01, 0.05, 0.1, 0.5, 1, 1.5, 2, 5, 10, 15, 20, 50, 100, 150, 200, 500, 1,000, 1,100, 1,200, 1,500, 2,000, 2,500, 5,000, 10,000, 15,000, 20,000, 50,000, 100,000, 150,000, 200,000, 500,000, 750,000, or about 999,999 ppm or more. The oxidizer can be any suitable oxidizer that oxidizes the phosphorus. The oxidizer can include ferrate, ozone, ferric chloride ($FeCl_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, hydroxide, sulfite, a free radical via decomposition thereof, or a combination thereof. Sufficient oxidizer can be added, and sufficient treatment conditions used, such that the oxidizer converts substantially all dissolved phosphorus in the water including the phosphorus into oxidized forms of phosphorus.

Byproducts of an oxidation process can include negatively charged ionic compounds that readily accept electrons and as a result are preferentially reduced at the surface of copper in the galvanic cell. Many of these compounds have very low regulatory limits, and the galvanic process can be used to remove or reduce the concentration of one or more of these highly regulated compounds prior to the discharge or reuse of the treated water. Examples of the most common compounds that can be reduced or removed are chloramines, chlorates, perchlorates, bromates, hypochlorous acid, bleach, and the like, organic compounds, and combinations thereof. Further, the galvanic process can reduce the oxygen levels in the water to values below 1 ppm, thus creating attractive condition for subsequent anoxic or anaerobic processes.

The method can be free of performing any steps to adjust pH of the treated water. In some embodiments, the method can include adjusting the pH of the separated water to be about 6 to 8, or about 7, or less than, equal to, or greater than about 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, or about 8 or more.

The method can include immersing one or more of the electrochemical cells in an enclosure including the water including the phosphorus. The method can include filtering the salt including the phosphorus from the treated water via one of more filters that are at least partially submerged in the water including the phosphorus that immerses the electrochemical cells. The filter can include a glass frit, a fabric filter, a paper filter, a disk filter, a rotary filter, a drum filter, a screen, a sieve, particulate filtration media, a filter aid, or a combination thereof. The filter can be a rotating disk filter. The filtering can include forming a filter cake on the filter, the filter cake including the salt including the phosphorus. The filtering can include backwashing the filter to remove the filter cake from the filter and to form a backwash liquor that includes the removed filter cake. Any suitable water can be used to backwash the filter, such as a portion of the water including the precipitate is used to backwash the filter.

The one or more electrochemical cells can be positioned in the water including the phosphorus at side portions of the enclosure, wherein the filter is positioned approximately in a central portion of the enclosure in the water including the phosphorus such that the filter is in-between the plurality of electrochemical cells. The method can include using a plurality of filters. The plurality of filters can include a plurality of rotating disk filters.

In embodiments of the galvanic cell including aluminum in the anode, the dissolution of the aluminum anode during the operation of the galvanic cell can generate high localized concentrations of aluminum ions on or very near the surface of the electrode which can favor the supersaturation and thermodynamic conditions for the precipitation of aluminum phosphate compounds. This surface condition can create a low metal-to-phosphorus molar ratio, even when phosphorus levels in water are below 0.1 ppm. The resulting equilibrium concentration of phosphate remaining in solution can be much lower than those obtained by simply adding aluminum salts to the water. When adding aluminum salts to phosphate-containing waters with the intent to obtain phosphorous concentrations below about 0.1 ppm, the metal-to-phosphorus molar ratios must be close to 8. In contrast, in the galvanic process described herein, the molar ratio of metal to phosphorus can be less than 8, such as approximately 1.

Electrochemical Cell.

In various embodiments the present invention provides an electrochemical cell. The electrochemical cell can be any suitable electrochemical cell that can be used to perform an embodiment of the method described herein. The method of removing phosphorus from water can include immersing an electrochemical cell (e.g., one or more electrochemical cells) in water including phosphorus to form treated water including a salt that includes the phosphorus. The electrochemical cell can include an anode including Mg, Al, Fe, Zn, or a combination thereof. The electrochemical cell can include a cathode including Cu, Ni, Fe, or a combination thereof.

The electrochemical cell can also include a conductive connector that electrically connects the anode and the cathode, the conductive connector including Cu, Zn, Fe, Cd, Ni, Sn, Pb, or a combination thereof. In some embodiments, the anode and the cathode directly contact one another and the electrochemical cell is free of the conductive connector, such that the electrodes are in an "electroless" configuration. In an electroless configuration, the sacrificial anode material can be electrochemically plated or deposited on the non-sacrificial cathode material, eliminating a need for conductive connectors to electrically connect the anode and the cathode. One advantage of various embodiments of the electroless configuration is that less metallic copper can be used and the electric drop between the electrodes can decrease compared to the configuration including conductive connectors.

The electrochemical cell can include one cathode, or a plurality of cathodes. The electrochemical cell can include one anode, or a plurality of anodes. The electrochemical cell can include no conductive connector, one conductive connector, or a plurality of conductive connectors. The electrochemical cell can include a plurality of conductive connectors, wherein each conductive connector independently electrically connects the anode and cathode (e.g., in a parallel, rather than a series configuration). The plurality of conductive connectors can be approximately evenly distributed around a perimeter of the electrochemical cell. The conductive connector can include a connector or fastener, such as a screw, a bolt, a nut, a washer, or a combination thereof.

The electrochemical cell can be of any suitable size or configuration such that the surface area of the electrochemical cell(s) per unit volume of water containing phosphorus to be removed is sufficient to effect removal of the phosphorus during the residence time of the water in the container. The electrochemical cell can have any suitable total surface area per electrochemical cell, or total anode surface area exposed to water per cell, such as about 1 cm$^2$ to about 1,000,000 cm$^2$, about 5 cm$^2$ to about 200,000 cm$^2$, about 10 cm$^2$ to about 50,000 cm$^2$, about 20 cm$^2$ to about 40,000 cm$^2$, or about 1 cm$^2$ or less, or less than, equal to, or greater than 2 cm$^2$, 4, 6, 8, 10, 15, 20, 25, 30, 35, 40, 45, 50, 75, 100, 150, 200, 250, 500, 750, 1,000, 1,500, 2,000, 2,500, 5,000, 7,500, 10,000, 15,000, 20,000, 25,000, 30,000, 35,000, 40,000, 45,000, 50,000, 75,000, 100,000, 150,000, 200,000, 500,000, 750,000, or about 1,000,000 cm$^2$ or more. The electrochemical cell can have any suitable ratio of anode surface area to cathode surface area, such as a ratio of anode surface area exposed to water to cathode surface area exposed to water, such as about 0.1 to about 10, 0.5 to 2, or less than, equal to, or greater than about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2, 2.1, 2.2, 2.3, 2.4, 2.5, 2.6, 2.8, 3, 3.5, 4, 4.5, 5, 5.5, 6, 7, 8, 9, or about 10 more. In some embodiments, the anode, the cathode, or a combination thereof, includes a roughened or etched surface for enhanced surface area. For the methods described herein, any suitable number of electrochemical cells can be used, such as 1, 1 to 1,000,000, 1 to 1,000, 1 to 20, or less than, equal to, or greater than 2, 3, 4, 5, 6, 7, 8, 9, 10, 12, 14, 16, 18, 20, 25, 30, 35, 40, 45, 50, 60, 70, 80, 90, 100, 125, 150, 175, 200, 225, 250, 300, 400, 500, 750, 1,000, 1,250, 1,500, 1,750, 2,000, 2,500, 3,000, 4,000, 5,000, 10,000, 20,000, 50,000, 100,000, 250,000, 500,000, or about 1,000,000 or more. The cells can be used in series or parallel electrical arrangement.

The electrochemical cell can include a spacing between a surface of the anode and a surface of the cathode (e.g., between the cathode and at least about 50% to 100% of the surface area of the anode, or about 80% to about 100%, or less than, equal to, or greater than about 50%, 55, 60, 65, 70, 75, 80, 85, 90, 95, 96, 97, 98, or about 99% or more) of about 1 mm to about 110 mm, or about 2 mm to about 30 mm, or less than, equal to, or greater than about 1 mm, 2, 3, 4, 5, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, 45, 50, 55, 60, 65, 70, 75, 80, 85, 90, 95, 100, 105, or about 110 mm or more.

The electrochemical cell can be planar in form, having a thickness that is less than a height and width. The electrochemical cell can include a planar frame of the electrochemical cell and a cathode material included within a perimeter of the frame, wherein the cathode material is electrically connected to the frame (e.g., via direct contact thereto). The frame can be a structural component of the electrochemical cell. The frame can be structurally sufficient to maintain its shape in the absence of any of or all of the anodes. The planar frame and the cathode material included within the perimeter of the frame can both be the cathode.

The planar frame can be a nonporous solid material. The planar frame can be one or more strips of cathode material assembled to form the frame. The planar frame can have a polygonal perimeter, such as a square or rectangle. The cathode material included within the perimeter of the planar frame can include a porous cathode material, such as including wire, mesh, screen, a sheet including one or more through-holes, or a combination thereof. The porous cathode material can include a wire mesh or a wire screen including the porous cathode material. The porous cathode material included within the perimeter of the planar frame can have edges that are sandwiched between two of the planar frames, the two planar frames held together to secure the porous cathode material therebetween with one or more of the conductive connectors, such as via compression, via conductive connectors passing through one or more through-holes of the porous cathode material, or a combination thereof.

The electrochemical cell can include a plurality of pairs of the planar frames (e.g., 2 pairs to 20 pairs, or 2 pairs to 10 pairs, or less than, equal to, or greater than 2, 3, 4, 5, 6, 7, 8, 9, 10, 11, 12, 13, 14, 15, 16, 17, 18, 19, or 20 or more pairs), with each pair held together to secure the porous cathode material therebetween with one or more of the conductive connectors, and each pair separated by one or more of the anodes spanning across the porous cathode material included within the perimeter of the planar frame. The one or more anodes that separate each pair of planar frames from one another can directly contact a face of each pair of planar frames separated therewith. The one or more anodes that separate each pair of planar frames from one another can directly contact a face of one of each pair of planar frames separated therewith and can be free of direct contact with a face of the other of each pair of planar frames separated therewith.

The anode can be a strip fastened to the planar frame at two edges of the planar frame, wherein the anode is fastened to the planar frame with at least one of the conductive connectors at each of the two edges of the planar frame, such that the anode spans across the cathode material included within the perimeter of the planar frame forming a gap between the cathode material included within the perimeter of the planar frame and the anode strip. The anode and the cathode can directly contact one another at each of the edges of the planar frame where the anode is fastened to the planar frame via the at least one conductive connector.

The electrochemical cell can include a plurality of the anodes, wherein each anode is a strip fastened to the planar frame at two edges of the planar frame on a face of the frame, wherein each of the anodes is fastened to the planar frame with at least one of the conductive connectors at each of the two edges of the planar frame, such that each of the anodes spans across the cathode material included within the perimeter of the planar frame forming a gap between the cathode material included within the perimeter of the planar frame and the anode strip, wherein the plurality of the anodes are spaced-apart across the face of the such that they do not physically contact one another. Each of the anodes can span across the cathode material included within the perimeter of the planar frame approximately parallel to one another on the face; anodes on another face of the planar frame can be parallel or perpendicular to the anodes on the first face. The two edges of the planar frame to which are fastened each anode can be opposite edges of the planar frame. The electrochemical cell can have all of its anodes on a single major face of the planar frame, or some of the anodes can be on one major face of the planar frame and the other anodes are on another major face of the frame.

FIG. 1A illustrates an electrochemical cell 110 viewed from a major face, according to various embodiments. The electrochemical cell 110 includes the cathode, wherein the cathode includes a planar frame 120 of the electrochemical cell having a polygonal perimeter and a porous material 130 included within the perimeter of the frame that is a wire mesh or a wire screen that is in direct contact with the frame. The electrochemical cell 110 includes a plurality of the anodes 140, wherein each anode is a strip fastened to the planar frame at two opposite edges of the planar frame on a face of the planar frame. Each of the anodes is fastened to the planar frame with at least one of the conductive connectors 150 at each of the two edges of the planar frame, such that each of the anodes are approximately parallel to one another and span across the porous material included within the perimeter of the planar frame forming a gap (not shown) between the porous material included within the perimeter of the planar frame and the anode strip. Each anode directly contacts the cathode frame at each of the edges of the planar frame where the anode is fastened to the planar frame via the at least one conductive connector. Conductive connectors (not shown) can also be used that only pass through the planar frame 120 to secure the porous material 130 therebetween. The plurality of the anodes are spaced-apart across the face of the such that they do not physically contact one another, and wherein the gap (not shown) is about 1 mm to about 110 mm.

Figure 1B:
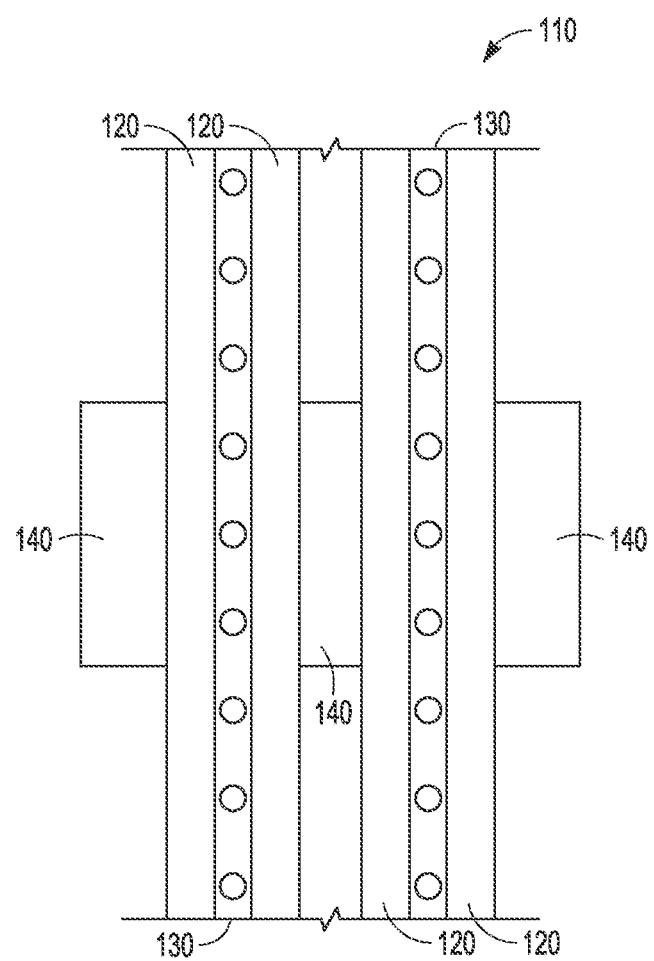
FIG. 1B illustrates a zoomed-in cutaway edge view of an electrochemical cell, according to various embodiments.

FIG. 1B illustrates a zoomed-in cutaway edge-view of electrochemical cell 110, viewed along the perspective shown to the right of FIG. 1A. The electrochemical cell can include a plurality of pairs of the planar frames 120, with each pair held together to secure the porous cathode material 130 therebetween with one or more of the conductive connectors (not shown). Anodes 140 spanning across the porous cathode material 130 included within the perimeter of the planar frame 120. Each pair of planar frames 120 is separated by anodes 140 (only one such anode is shown in FIG. 1). The one or more anodes 140 that separate each pair of planar frames from one another directly contact a face of each pair of planar frames 120 separated therewith.

Method of Making Struvite.

In various embodiments, the present invention provides a method of making struvite (e.g., $NH_4MgPO_4 \cdot 6H_2O$) using the electrochemical cell and methods of using the same described herein. The method can include immersing an electrochemical cell in water including phosphorus having a pH of about 10 to about 11 to form treated water including a salt that includes the phosphorus. The salt that includes the phosphorus can include struvite. The struvite can include the phosphorus from the water and Mg from the anode. The electrochemical cell can include an anode including Mg, wherein the anode is about 90 wt % to about 100 wt % Mg. The electrochemical cell can include a cathode including Cu, wherein the cathode is about 90 wt % to about 100 wt % Cu. The method can include separating the salt including the phosphorus from the treated water to obtain separated struvite and to form separated water having a lower phosphorus concentration than the water including phosphorus.

The salt that includes the phosphorus can include struvite if sufficient ammonia or ammonium ions are available in the water to satisfy the stoichiometric requirements to form struvite. In various embodiments, struvite can be produced when ammonia or ammonium ions are not present in the source of the water including the phosphorus, or are present only in low concentration, such as due to formation of ammonia or ammonium ions by the process of reduction of nitrogen-containing compounds (e.g., nitrate or nitrite) on the cathode surface of the electrochemical cell.

The electrochemical cell can also include a conductive connector that electrically connects the anode and the cathode, the conductive connector including Cu, Zn, Fe, Cd, Ni, Sn, Pb, or a combination thereof. In some embodiments, the anode and the cathode directly contact one another and the electrochemical cell is free of the conductive connector.

The method can include purifying the separated struvite, such as by recrystallization (e.g., dissolution of the solid to form a mother liquor followed by crystallization, leaving behind at least some of the impurities in the mother liquor), liquid extraction, filtration, or a combination thereof.

The water the includes the phosphorus can further include nitrogen. The nitrogen can be from any suitable source. The nitrogen can be natively present in the water including the phosphorus, the nitrogen can be added to the water, or a combination thereof. Adding nitrogen to the water including phosphorus can including adding nitrogen in any suitable form. For example, nitrogen can be added to the water including phosphorus by adding $KNO_3$, $HNO_3$, an organic nitrogen compound, or a combination thereof.

The method can include adding phosphorus to water to form the water including phosphorus. Any suitable phosphorus-containing material can be added to the water to form the water including phosphorus, such as phosphoric acid, an organic phosphorus-containing material, or a combination thereof.

Method of Making $AlPO_4$, Aluminum Hydroxide, or a Combination Thereof.

In various embodiments, the present invention provides a method of making $AlPO_4$, aluminum hydroxide, or a combination thereof, using embodiments of the electrochemical cell and methods of using the same described herein. The method can include immersing an electrochemical cell in water including phosphorus having a pH of about 5 to about 7 to form treated water including a salt that includes the phosphorus. The salt that includes the phosphorus can include $AlPO_4$ or a hydrate thereof, the $AlPO_4$ including the phosphorus and Al from the anode; aluminum hydroxide or a hydrate thereof, the aluminum hydroxide including Al from the anode; or a combination thereof. The electrochemical cell can include an anode including Al, wherein the anode is about 90 wt % to about 100 wt % Al. The electrochemical cell can include a cathode including Cu, wherein the cathode is about 90 wt % to about 100 wt % Cu. The method can also include separating the salt including the phosphorus from the treated water, to form separated water having a lower phosphorus concentration than the water including phosphorus.

The electrochemical cell can also include a conductive connector that electrically connects the anode and the cathode, the conductive connector including Cu, Zn, Fe, Cd, Ni, Sn, Pb, or a combination thereof. In some embodiments, the anode and the cathode directly contact one another and the electrochemical cell is free of the conductive connector.

The method can include adding phosphorus to water to form the water including phosphorus. Any suitable phosphorus-containing material can be added to the water to form the water including phosphorus, such as phosphoric acid, an organic phosphorus-containing material, or a combination thereof.

The method can include purifying the salt including the phosphorus, to provide purified $AlPO_4$, purified aluminum hydroxide, or a purified mixture of $AlPO_4$ and aluminum hydroxide. Purification can be performed in any suitable way, such as by recrystallization (e.g., dissolution of the solid to form a mother liquor followed by crystallization, leaving behind at least some of the impurities in the mother liquor), liquid extraction, filtration, or a combination thereof.
Method of Making Magnesium Phosphate, $Mg(OH)_2$, or a Combination Thereof.

In various embodiments, the present invention provides a method of making magnesium phosphate, $Mg(OH)_2$, or a combination thereof, using embodiments of the electrochemical cell and methods of using the same described herein. The method of making magnesium phosphate, $Mg(OH)_2$, or a combination thereof, can include immersing an electrochemical cell in water including phosphorus having a pH of about 10 to about 11 to form treated water including a salt that includes the phosphorus. The salt that includes the phosphorus can include magnesium phosphate, magnesium potassium phosphate, a hydrate thereof, or a combination thereof, $Mg(OH)_2$ including Mg from the anode; or a combination thereof. The electrochemical cell can include an anode including Mg, wherein the anode is about 90 wt % to about 100 wt % Mg. The electrochemical cell can include a cathode including Cu, wherein the cathode is about 90 wt % to about 100 wt % Cu. The method can also include separating the salt including the phosphorus from the treated water, to form separated water having a lower phosphorus concentration than the water including phosphorus.

The electrochemical cell can also include a conductive connector that electrically connects the anode and the cathode, the conductive connector including Cu, Zn, Fe, Cd, Ni, Sn, Pb, or a combination thereof. In some embodiments, the anode and the cathode directly contact one another and the electrochemical cell is free of the conductive connector.

The method can include adding phosphorus to water to form the water including phosphorus. Any suitable phosphorus-containing material can be added to the water to form the water including phosphorus, such as phosphoric acid, an organic phosphorus-containing material, or a combination thereof.

The method can include purifying the salt including the phosphorus, to provide purified magnesium phosphate, purified $Mg(OH)_2$, or a purified mixture of magnesium phosphate and $Mg(OH)_2$. Purification can be performed in any suitable way, such as by recrystallization (e.g., dissolution of the solid to form a mother liquor followed by crystallization, leaving behind at least some of the impurities in the mother liquor), liquid extraction, filtration, or a combination thereof.
Method of Removing One or More Dissolved Transition Metals, Post-Transition Metals, or Metalloids from Water.

In various embodiments, the present invention provides a method of removing one or more dissolved transition metals, post-transition metals, or metalloids from water, using an embodiment of the electrochemical cell and methods of using the same described herein. The water can include any suitable amount of phosphorus, or the water can be substantially free of phosphorus. Any suitable embodiment of the electrochemical cell or method of using the same described herein in the content of removing phosphorus from water can be included in the method of removing one or more dissolved transition metals, post-transition metals, or metalloids from water. The method can include immersing an electrochemical cell in water including the one or more dissolved transition metals, post-transition metals, or metalloids to form treated water including a hydroxide salt that includes the one or more transition metals, post-transition metals, or metalloids. The electrochemical cell can include an anode including Mg, Al, Fe, Zn, or a combination thereof. The electrochemical cell can include a cathode including Cu, Ni, Fe, or a combination thereof. The method can include separating the salt including the hydroxide salt that includes the one or more transition metals, post-transition metals, or metalloids, to form separated water having a lower concentration of the one or more transition metals, post-transition metals, or metalloids than the water including the one or more transition metals, post-transition metals, or metalloids.

The electrochemical cell can also include a conductive connector that electrically connects the anode and the cathode, the conductive connector including Cu, Zn, Fe, Cd, Ni, Sn, Pb, or a combination thereof. In some embodiments, the anode and the cathode directly contact one another and the electrochemical cell is free of the conductive connector.

The one or more transition metals, post-transition metals, or metalloids can be any suitable transition metals, post-transition metals, or metalloids that can be removed using the electrochemical cell. The one or more transition metals, post-transition metals, or metalloids can include Sc, Y, Ti, V, Cr, Mn, Fe, Co, Ni, Cu, Zr, Nb, Mo, Tc, Ru, Rh, Pd, Ag, Hf, Ta, W, Re, Os, Ir, Pt, Au, Rf, Db, Sg, Bh, Hs, Al, Zn, Ga, Cd, In, Sn, Hg, Tl, Pb, Bi, Po, Cn, B, Si, Ge, As, Sb, Te, At, or a combination thereof. The one or more transition metals, post-transition metals, or metalloids can include Hg, Fe, Cr, Ni, Zn, Cd, As, or a combination thereof.

The method can remove any suitable amount of the transition metal, post-transition metal, metalloid, or combination thereof from the water. The separated water can have a concentration of the transition metal, post-transition metal, metalloid, or combination thereof, that is about 0% to about 70% of a concentration of the transition metal, post-transition metal, metalloid, or combination thereof, in the water including the one or more dissolved transition metals, post-transition metals, or metalloids, or about 0% to about 20%, or about 0%, or about 1% or less, or less than, equal to, or greater than about 2%, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, or about 70% or more of a concentration of the transition metal, post-transition metal, metalloid, or combination thereof, in the water including the one or more dissolved transition metals, post-transition metals, or metalloids.

EXAMPLES

Various embodiments of the present invention can be better understood by reference to the following Examples which are offered by way of illustration. The present invention is not limited to the Examples given herein.

Galvanic cells of several sizes were utilized to evaluate aspects of the process as outlined in the Examples. The galvanic cells are referenced as "small", "medium", and "large", as defined below. Magnesium anodes were AZ91, with 90 wt % Mg, 9 wt % Al, and 1 wt % Zn, and were 99.9 wt % pure. Aluminum anodes were 99.9 wt % pure aluminum. The copper used in copper frames and copper mesh was 99.9 wt % pure copper.

Figure 2A:
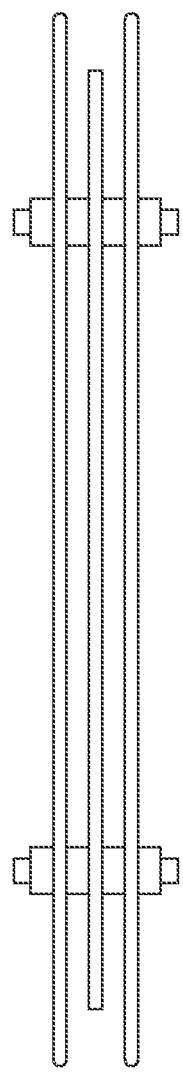
FIG. 2A illustrates a photograph along the edge of an Al—Cu electrochemical cell, in accordance with various embodiments.
Figure 2B:
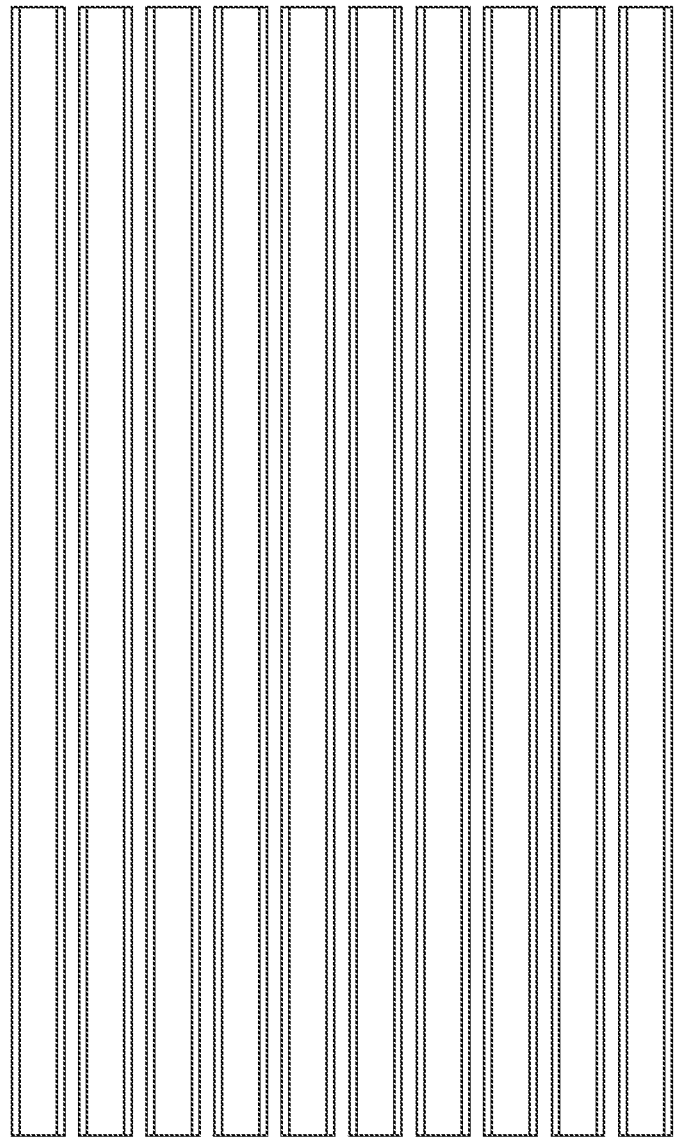
FIG. 2B illustrates a photograph along an edge of a plurality of Al—Cu electrochemical cells, in accordance with various embodiments.

For a small-sized cell, having copper cathodes and either an aluminum or magnesium anode, the finished size was 5 cm×20 cm with a thickness of about 4 mm and utilized copper meshes and an anode having a thickness of about 1 mm each. The small-sized cell included a single pair of copper meshes with an anode sandwiched therebetween, with the copper meshes and the anode separated from the copper meshes by 0.5 cm using electrically insulating plastic screws. The copper meshes were electrically connected to one another via a copper wire. The anode and the cathode were not electrically connected to one another (other than via multimeter and the surrounding water). The resulting surface area of sacrificial anode exposed to the water was about 400 $mm^2$ per cell. FIG. 2A illustrates a photograph along the edge of an Al—Cu electrochemical cell For a medium-sized cell, having a copper cathode and either aluminum or magnesium anodes, the finished size was about 300 mm×45 mm with a thickness of about 10 mm and utilized a single pair of copper meshes with an anode sandwiched therebetween. The copper mesh directly contacted the anode, and was connected thereto via brass bolts (common brass, 67 wt % copper and 33 wt % Zn). The resulting surface area of sacrificial anode exposed to the water was about 31,400 $mm^2$ per cell. FIG. 2B illustrates a photograph along an edge of a plurality of medium-sized Al—Cu electrochemical cells.

The large-sized electrochemical cells used in the Examples included cathodes that are pairs of planar solid copper frames that sandwich a copper mesh, with brass connectors securing the copper frames together to secure the copper mesh between the frames. The solid copper frames formed a rigid structural perimeter of the cell, with the copper mesh filling the entire area within the perimeter of each pair of copper frames. A plurality of anode strips, which were magnesium alloy or aluminum, were fastened to the perimeter of the frame with brass fasteners such that they spanned from one edge of the frame to the other frame, directly contacting the frame and forming a gap between the anodes and the copper mesh. Each electrochemical cell included two pairs of the copper frames having the copper mesh therebetween (i.e., four copper frames total, with two copper meshes). A first pair of copper frames had anodes affixed to a single major face thereof, the second pair of copper frames had anodes affixed to both major faces thereof, with the two pairs of copper frames affixed to one another with brass fasteners such that they do not directly contact one another and such that they sandwich the anodes affixed to one major face of the second pair of copper frames. The brass fasteners were common brass and were 67 wt % copper and 33 wt % Zn. The anodes ran horizontally across each major face of the copper frames and parallel to one another, with 6 anodes affixed to each face. From one major face of the electrochemical cell to the other, the order of components is 1) the anodes affixed to a major face of the first pair of copper frames, 2) the first pair of copper frames having copper mesh therebetween, 3) the anodes affixed to a major face of the second pair of copper frames, 4) the second pair of copper frames having copper mesh therebetween, and 5) the anodes affixed to the other major face of the second pair of copper frames. The ratio of anode surface area to cathode surface area for the electrochemical cell was about 1:1.

For a large-sized cell, each copper frame had a thickness of 3.175 mm (⅛ inch). The height of the copper frame was 400 mm and the length of the copper frame was 400 mm. The copper mesh had a thickness of 1.5875 mm, such that each pair of copper frames sandwiching the copper mesh had a thickness of about 8 mm. The anode strips had a length of 400 mm, a width of 45 mm, and a thickness of 6 mm. The thickness of the entire electrochemical cell was about 30 mm. The gap between the anodes on each face of the copper frames was 12-18 mm. The gap between the anodes affixed to each pair of copper frames and the copper mesh sandwiched therebetween was 12-18 mm. The large-sized cell using aluminum anodes included an anode surface area exposed to the water of about 290,000 $mm^2$, and the large-sized cell using magnesium included an anode surface area exposed to the water of about 868,000 $mm^2$.

Figure 2C:
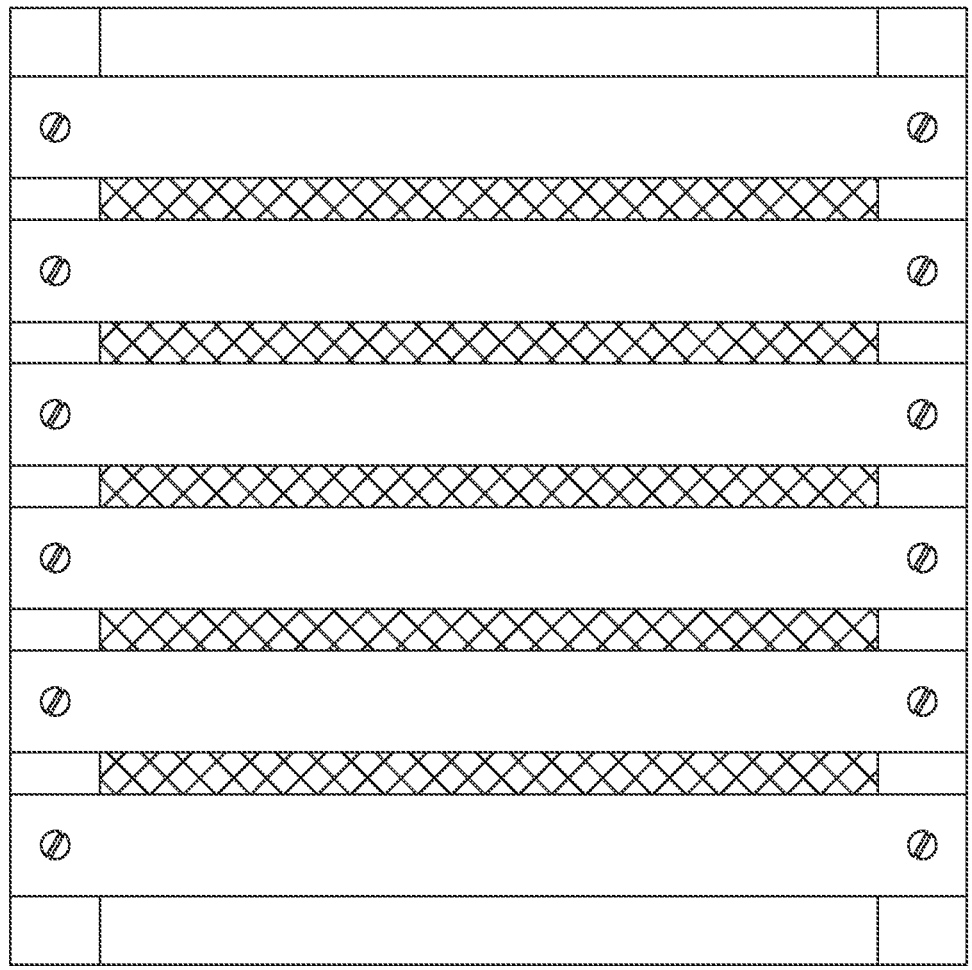
FIG. 2C illustrates a photograph of a major face of a Mg—Cu electrochemical cell, in accordance with various embodiments.
Figure 2D:
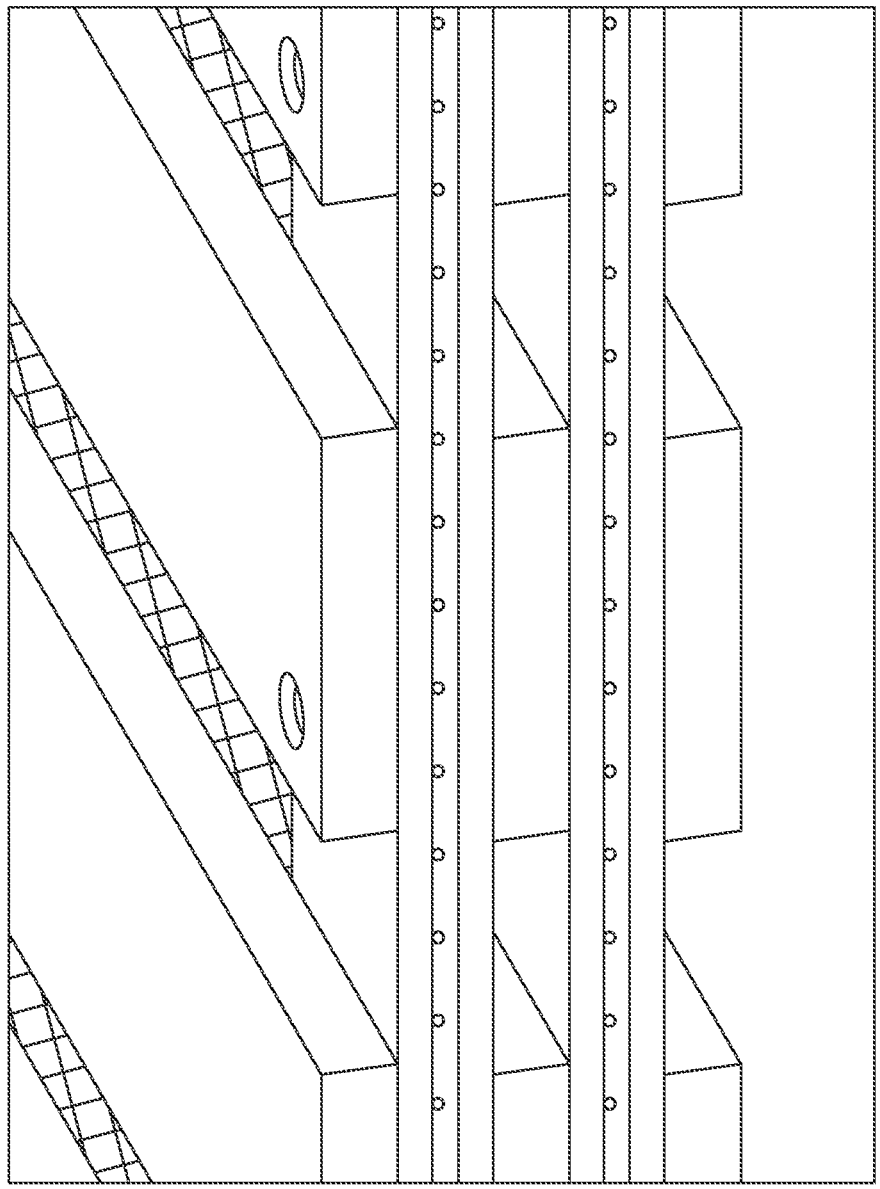
FIG. 2D illustrates a photograph of an edge of a Mg—Cu electrochemical cell, in accordance with various embodiments.
Figure 2E:
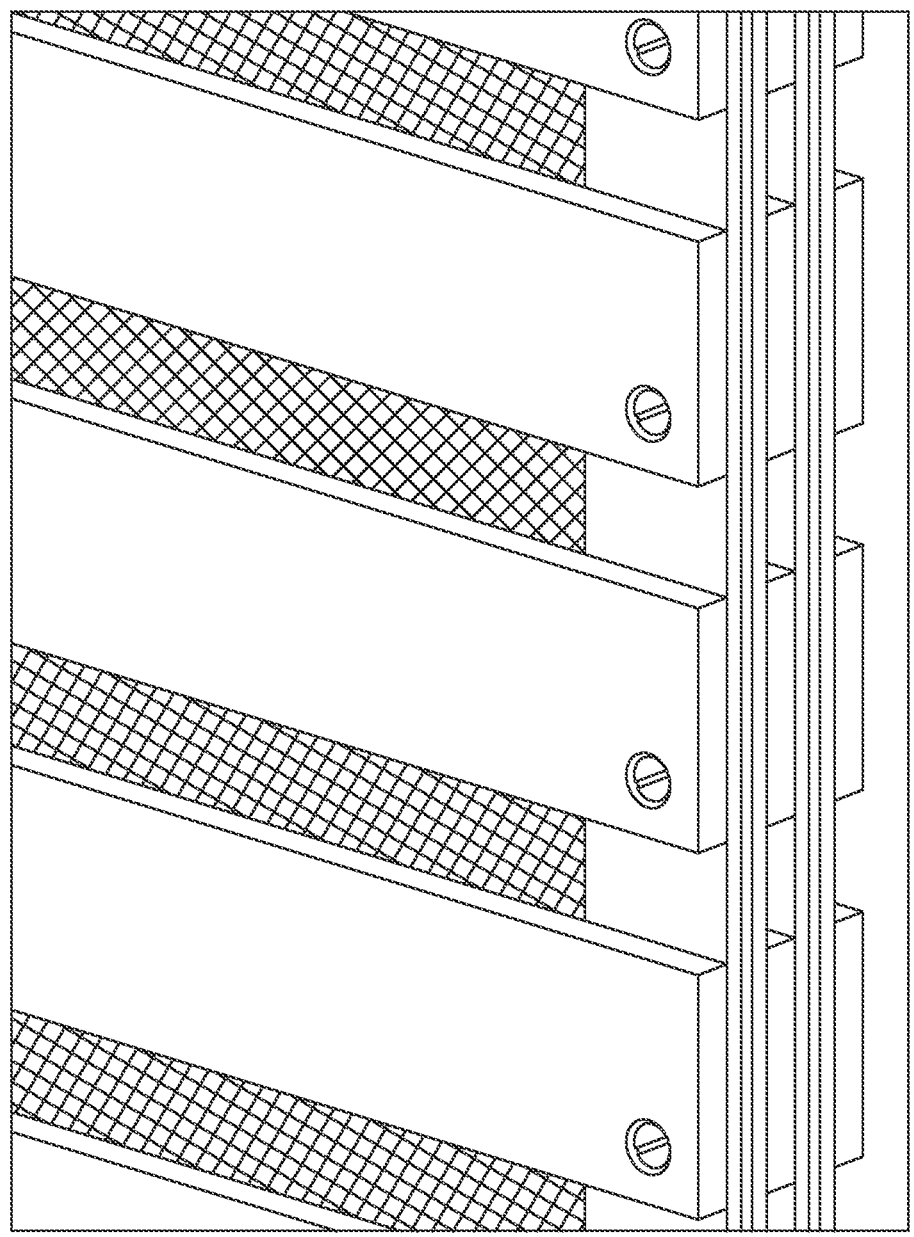
FIG. 2E illustrates a photograph of an edge of a Mg—Cu electrochemical cell, in accordance with various embodiments.

FIG. 2C illustrates a photograph of a major face of the large-sized Mg—Cu electrochemical cell used in the Examples. FIGS. 2D and 2E illustrate close-up photographs of an edge of the large-sized Mg—Cu electrochemical cell used in the Examples.

Figure 2F:
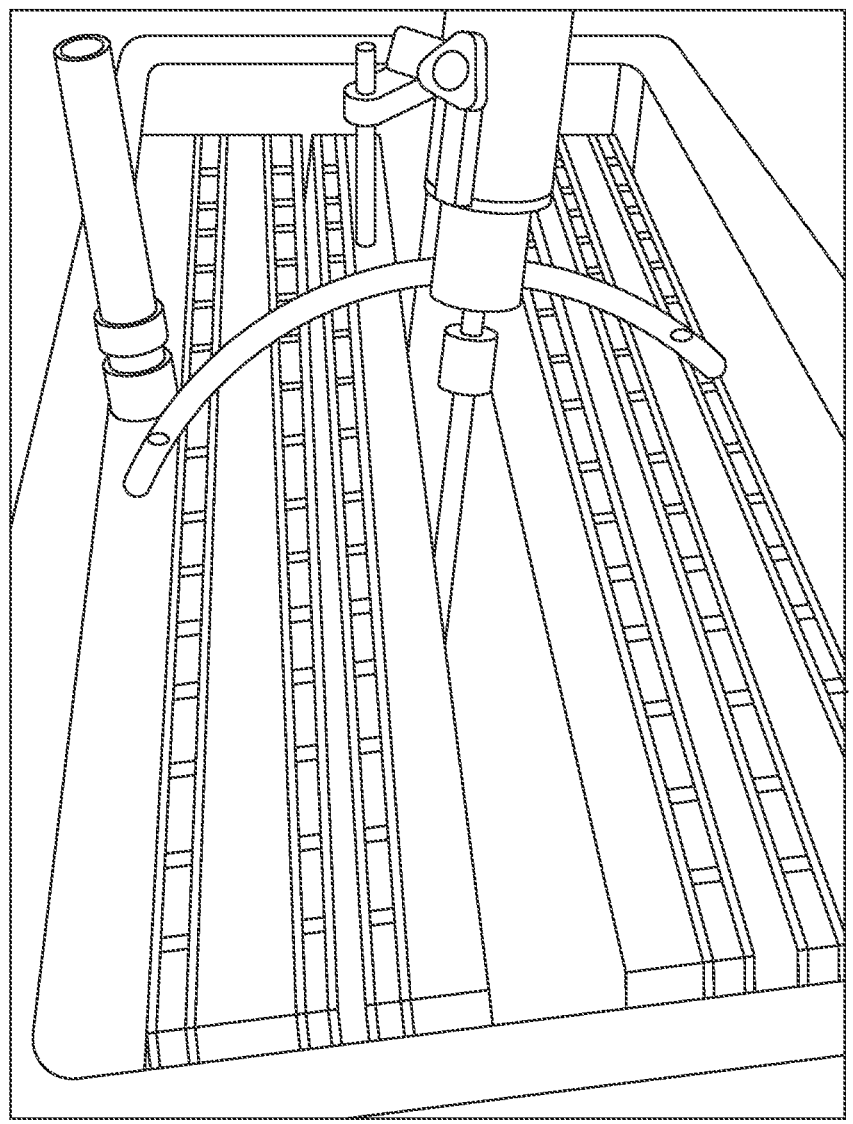
FIG. 2F illustrates a photograph showing a top view of a system for removing materials from water, in accordance with various embodiments.
Figure 2G:
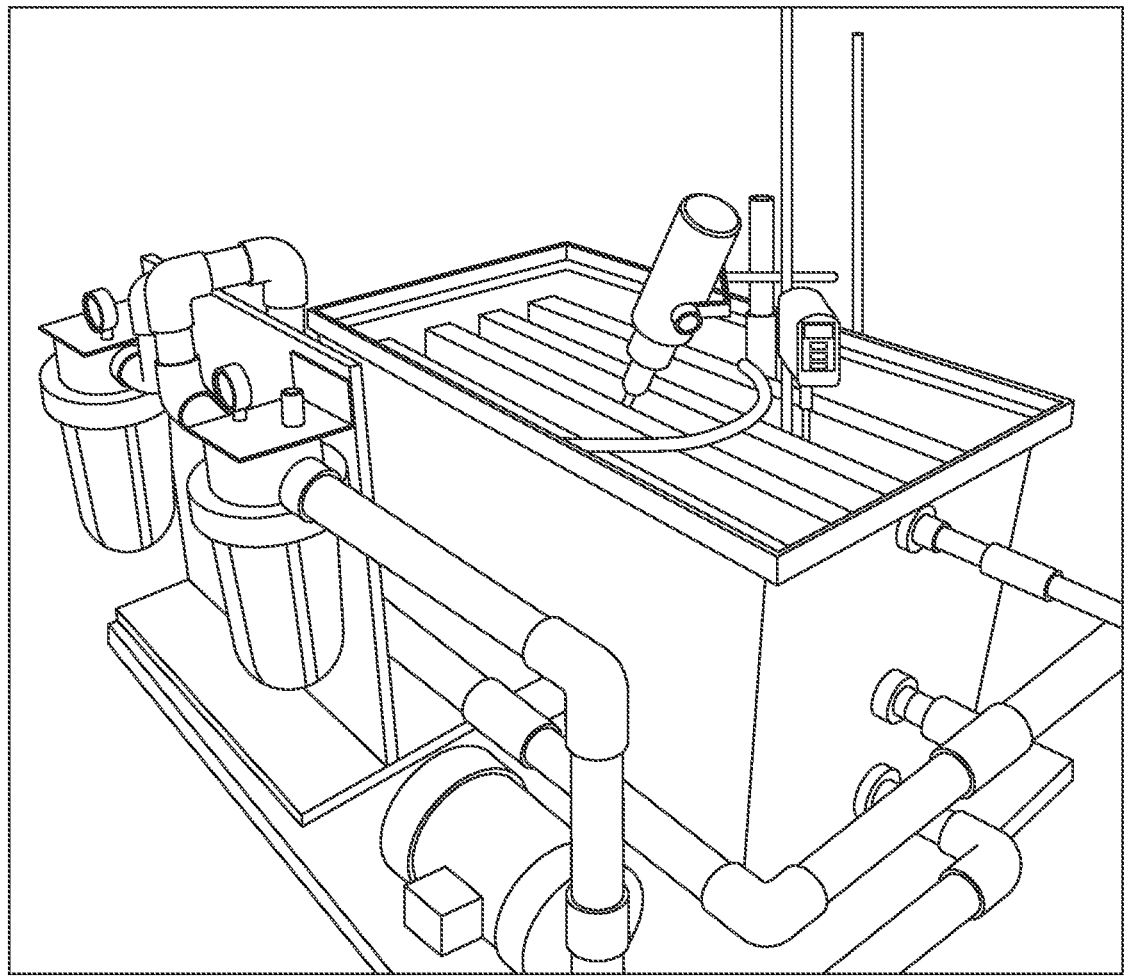
FIG. 2G illustrates a photograph showing a side-view of a system for removing materials from water, in accordance with various embodiments.

In the Examples herein, the Al—Cu or Mg—Cu electrochemical cell was completely immersed in water in a container, such that electrochemical cell was vertically oriented with the anodes running vertically. When multiple electrochemical cells were used, they were separated by about 25 mm using a wooden frame. In the middle of the container a mechanical stirrer was used to agitate the water therein. Water was filtered and fed into the container using a pump. Another pump was used to circulate water and filter water within the container (e.g., to remove precipitate therefrom), with water pumped from one side of the container and recirculated to the other side. A pump connected to a reservoir of 10% HCl was used to add HCl to the container to adjust the pH of the water therein. The water in the container was measured to determine the pH thereof, which was used to determine the amount of acid that needed to be added from the reservoir to maintain a specific pH. The water fed into the container was analyzed to determine initial pH, initial conductivity, and initial reactive phosphorus content. For the Mg—Cu cell, the water fed into the container was also analyzed to determine the initial dissolved magnesium content. The pH and conductivity of water in the container was measured. The container included a drain at the water level of the container to allow water to exit the system. The water that exited the system was analyzed to determine the final pH, final conductivity, and final reactive phosphorus content. For the Al—Cu cell, the water exiting the containing was analyzed to determine the total Al and dissolved Al. For the Mg—Cu cell, the water exiting the container was analyzed to determine the dissolved magnesium content. FIG. 2F illustrates a photograph showing a top-view of the system used in the Examples, with the specific embodiment shown in the photograph having 12 electrochemical cells (6 in front, and 6 in back arranged edge-to-edge with the 6 in front). FIG. 2G illustrates a photograph showing a side-view of the system used in the Examples, with the specific embodiment having 12 electrochemical cells therein.

The "reactive phosphorus concentration" refers to the soluble reactive phosphorus in solution (e.g., orthophosphate) and was measured by US-EPA 365.1: Determination of Phosphorus by Semi-Automated Colorimetry. The pH was measured using an Oakton® pH 700 meter. The conductivity was measured using an Oakton® CON 150 meter. The dissolved magnesium content was measured using a Thermo Scientific™ Dionex™ Aquion™ ion chromatography system. The total aluminum content and dissolved aluminum content were measured using a Hach Aluminum TNT Plus™ vial test. Dissolved Al was determined at the pH of the water exiting the container. Total Al was determined by adjusting the pH to 2.

Example 1. Removal of Phosphorus with Al—Cu Cell, Initial P Concentration 0.033 ppm Water was taken from one of the channels of a local lake and the residence time in the galvanic process was modified by adjusting the water flow to provide specific residence times while keeping the other variables of the system constant (pH, conductivity, and concentration of phosphorus). Residence time (i.e., volume of the container divided by the flow rate) was gradually decreased until removal performance was reduced and then held constant for this Example. For a low initial concentration of phosphorus (0.033 ppm) residence time was reduced to approximately 15 min while maintaining an average of about 90% removal of phosphorus. The Al—Cu cell was medium-sized. The results are shown in Table 1.

TABLE 1

Removal of phosphorus with Al-Cu cell, initial P concentration 0.033 ppm.

| Water Source | Local Lake (C44) | | |
|---|---|---|---|
| Flow Rate (mL/min) | 650 | 950 | 1261 |
| Residence Time (mins) | 30 | 20 | 15 |
| Electrochemical cells | 8 | 8 | 8 |
| Initial pH | 8.43 | 8.43 | 8.43 |
| Final pH | 7.05 | 7.03 | 7.02 |
| Initial Conductivity (µS) | 776 | 776 | 776 |
| Final Conductivity (µS) | 778 | 778 | 778 |
| Initial reactive-P (ppm) | 0.033 | 0.033 | 0.033 |
| Final reactive-P (ppm) | 0.0028 | 0.0028 | 0.0027 |
| % P removal | 91.5 | 91.5 | 91.5 |
| Final total Al (ppm) | 1.18 | 1.00 | 1.00 |
| Final dissolved Al (ppm) | 0.134 | 0.115 | 0.110 |

Example 2. Removal of Phosphorus with Al—Cu Cell, Initial P Concentration 0.451 ppm Water from a local inland wastewater treatment facility was processed to evaluate the effect of increasing solution conductivity. Residence time was held constant during this Example at 21 min. Conductivity was modified by adding NaCl. This Example demonstrates the beneficial effect of increased conductivity on the effectiveness of phosphorus removal. The Al—Cu cell was medium-sized. The results are shown in Table 2.

TABLE 2

Removal of phosphorus with Al-Cu cell, initial P concentration 0.451 ppm. Cell size = medium.

| Water Source | Inland Wastewater Plant | |
|---|---|---|
| Flow Rate (mL/min) | 920 | 920 |
| Residence Time (mins) | 21 | 21 |
| Electrochemical cells | 8 | 8 |
| Initial pH | 7.69 | 7.69 |
| Final pH | 7.02 | 6.93 |
| Initial Conductivity (µS) | 673 | 960 |
| Final Conductivity (µS) | 672 | 962 |
| Initial reactive-P (ppm) | 0.451 | 0.451 |
| Final reactive-P (ppm) | 0.062 | 0.027 |
| % P removal | 86.3 | 94.0 |
| Final total Al (ppm) | 1.15 | 1.81 |
| Final dissolved Al (ppm) | 0.037 | 0.056 |

Example 3. Removal of Phosphorus with Al—Cu Cell, Initial P Concentration 0.392 ppm A coastal wastewater treatment plant effluent with high electrical conductivity was treated using the medium Al—Cu cell. As noted in Example 2 above, increased conductivity is beneficial. The water treated in this Example was from a coastal location where the salt (NaCl) concentration results in elevated conductivity. The purpose of this Example is to evaluate the loss of sacrificial electrode material to the treated water solution and to evaluate this relationship as a function of pH. The final phosphorus removal efficiency remained constant; however, the concentration of total aluminum (dissolved and solid) decreases when modifying the pH from pH 7 to pH 6.5. This Example demonstrates the ability to control the loss of material from the sacrificial electrode by adjusting the pH. The results are shown in Table 3.

TABLE 3

Removal of phosphorus with Al-Cu cell, initial P concentration 0.392 ppm. Cell size = medium.

| Water Source | Coastal Wastewater Facility | |
|---|---|---|
| Flow Rate (mL/min) | 920 | 920 |
| Residence Time (mins) | 21 | 21 |
| Electrochemical cells | 8 | 8 |
| Initial pH | 9.06 | 9.06 |
| Final pH | 7.00 | 6.47 |
| Initial Conductivity (µS) | 3100 | 3100 |
| Final Conductivity (µS) | 3141 | 3110 |
| Initial reactive-P (ppm) | 0.392 | 0.392 |
| Final reactive-P (ppm) | 0.042 | 0.032 |
| % P removal | 89.3 | 91.8 |
| Final total Al (ppm) | 2.24 | 1.90 |
| Final dissolved Al (ppm) | 0.055 | 0.059 |

Example 4. Removal of Phosphorus with Al—Cu Cell, Initial P Concentration 0.648-0.762 ppm Water from a local fresh water retention pond was spiked with phosphoric acid to obtain a concentration of 0.75 ppm of phosphorus and was treated utilizing multiple galvanic cells in a continuous flow apparatus with a flow of about 2 gallons per minute (GPM) (large cell). The pH of the water was adjusted incrementally downward to values between 7 and 6. An increase the percentage of removal from 82% at pH=7 to 97% at pH=6 was observed, while reducing the soluble aluminum remaining in the treated water. The results are shown in Table 4.

TABLE 4

Removal of phosphorus with Al-Cu cell, initial P concentration 0.648-0.762 ppm. Cell size = large.

| Water Source | Retention Pond | | |
|---|---|---|---|
| Flow Rate (mL/min) | 7797.1 | 7797.1 | 7797.1 |
| Residence Time (mins) | 20-25 | 20-25 | 20-25 |
| Electrochemical cells | 12 | 12 | 12 |
| Initial pH | 7.03 | 7.06 | 7.03 |
| Final pH | 6.96 | 6.5 | 5.95 |
| Initial Conductivity (µS) | 680.9 | 689 | 680.9 |
| Final Conductivity (µS) | 671.7 | 676.3 | 695.4 |
| Initial reactive-P (ppm) | 0.742 | 0.648 | 0.762 |
| Final reactive-P (ppm) | 0.135 | 0.047 | 0.024 |
| % P removal | 81.8 | 92.7 | 96.9 |
| Final total Al (ppm) | 3.17 | 2.78 | 4.38 |
| Final dissolved Al (ppm) | 0.035 | 0.029 | 0.028 |

Example 5. Conductivity Effects on Electrical Current Generated by Al—Cu Cell Versus Time Using a small-sized cell, Al-foil and Cu screens having a size of 5 cm×2 cm were separated by 0.5 cm using plastic screws. The Al-foil/Cu was placed in a simple compartment with magnetic stirring that was filled with 30 mL water from a local freshwater retention pond. The currents were measured with a Keithley 175 multimeter connected in series. The initial conductivity was adjusted with NaCl. The electrical current generated by the Al—Cu galvanic pair in the Al—Cu cell was measured. This electric current is a measure of the amount of the anode material that was transformed in the electrodes as a function of time, e.g., the oxidation reaction of aluminum to generate aluminum ions and the decomposition of water on the copper electrode to generate hydrogen and hydroxyl ions.

Figure 3:
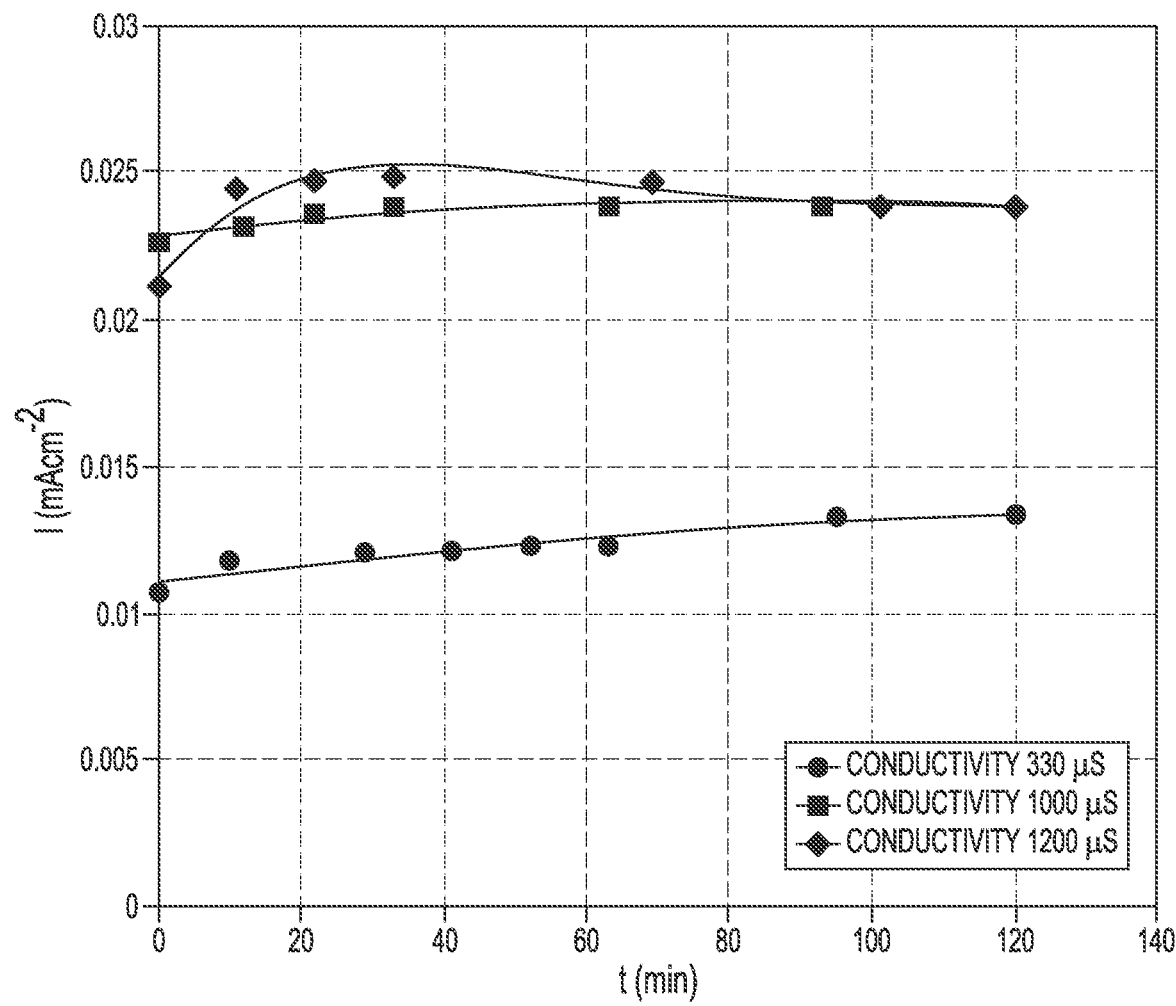
FIG. 3 illustrates electrical current generated by an Al—Cu cell versus time for solutions having various conductivities, in accordance with various embodiments.

FIG. 3 shows the variation of the electric current that was generated by the Al—Cu galvanic pair as a function of the conductivity of the solution. The initial pH of the water was not modified and was about 7. An increase of the initial conductivity of the solution up to a value of 1000 μS increases the electric current due to a decrease in the resistance between the electrodes thereby increasing the rate of the chemical reactions at the electrode surface. A similar result was obtained in Example 2. Increasing the conductivity to values higher than 1000 μS resulted in little change in the electrical current because at higher conductivity values the rate limiting step of the reaction is the kinetics of the chemical processes at the surface of the electrodes.

Figure 4:
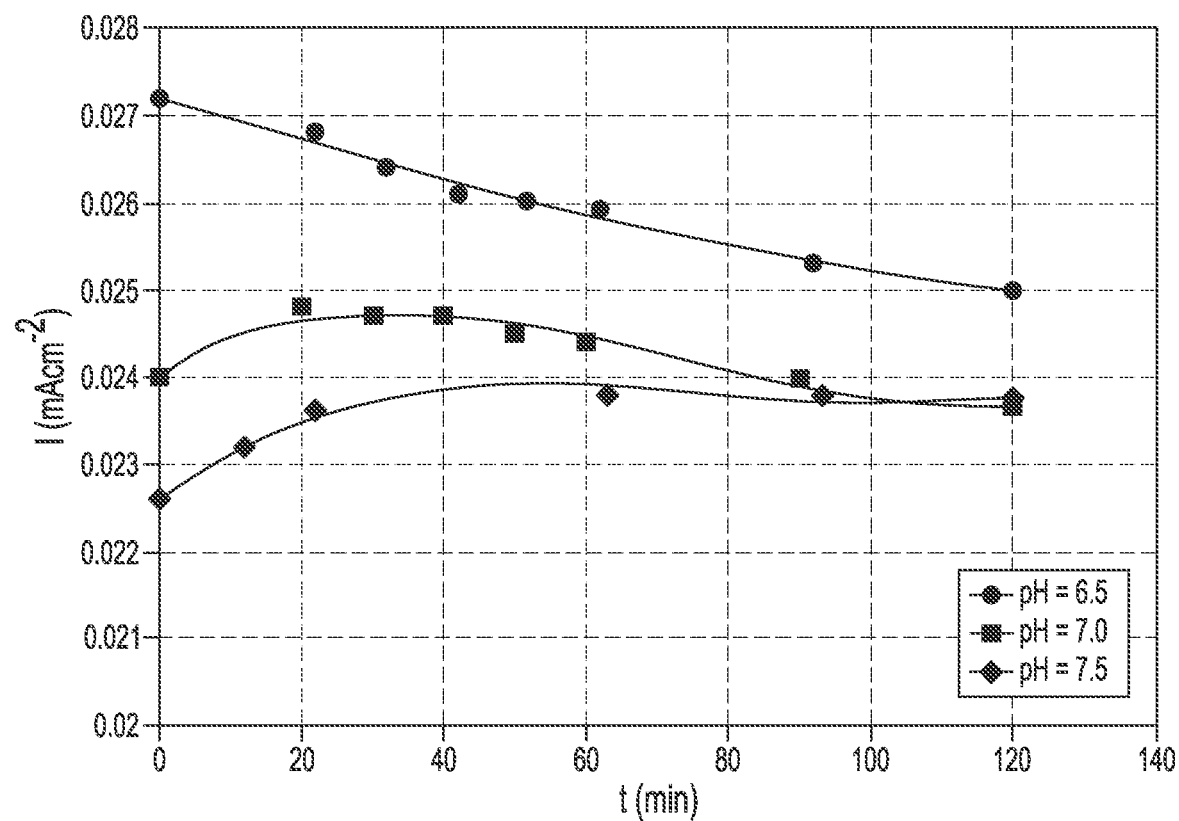
FIG. 4 illustrates electrical current generated by an Al—Cu cell versus time for solutions having various pH levels, in accordance with various embodiments.

Example 6. pH Effects on Electrical Current Generated by Al—Cu Cell Versus Time The same experimental conditions as Example 5 were used, but adjusting the initial pH with NaOH, with the initial conductivity of the water adjusted with NaCl to about 1000 μS. FIG. 4 shows the variation of the electric current generated by the Al—Cu galvanic pair as a function of the pH of the solution. Decreasing the pH of the solution favors the kinetics of the decomposition of water on the copper electrode, which translates into an increase in electrical current by the Al—Cu galvanic pair.

Figure 5A:
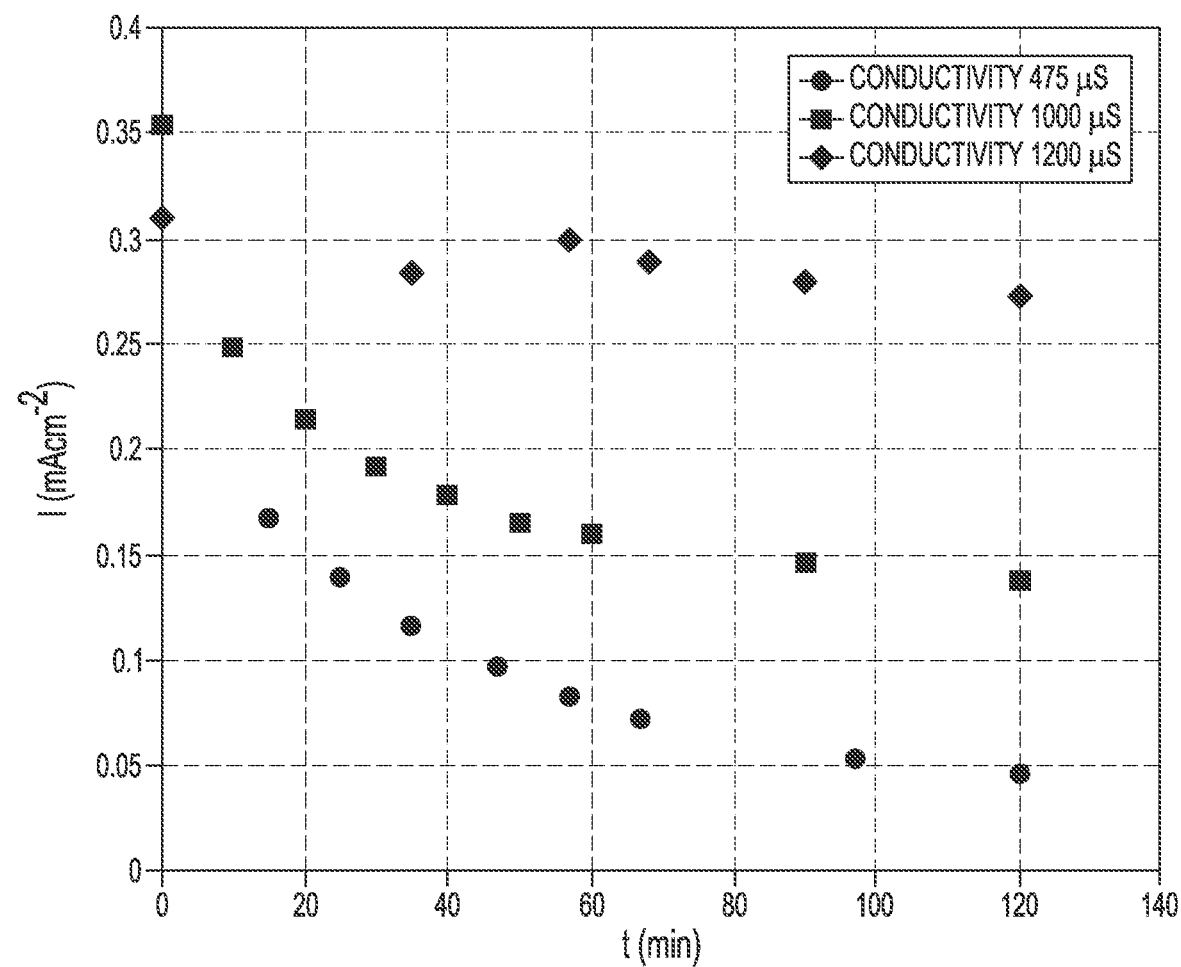
FIG. 5A illustrates electrical current generated by an Mg—Cu cell versus time for solutions having various conductivities, in accordance with various embodiments.
Figure 5B:
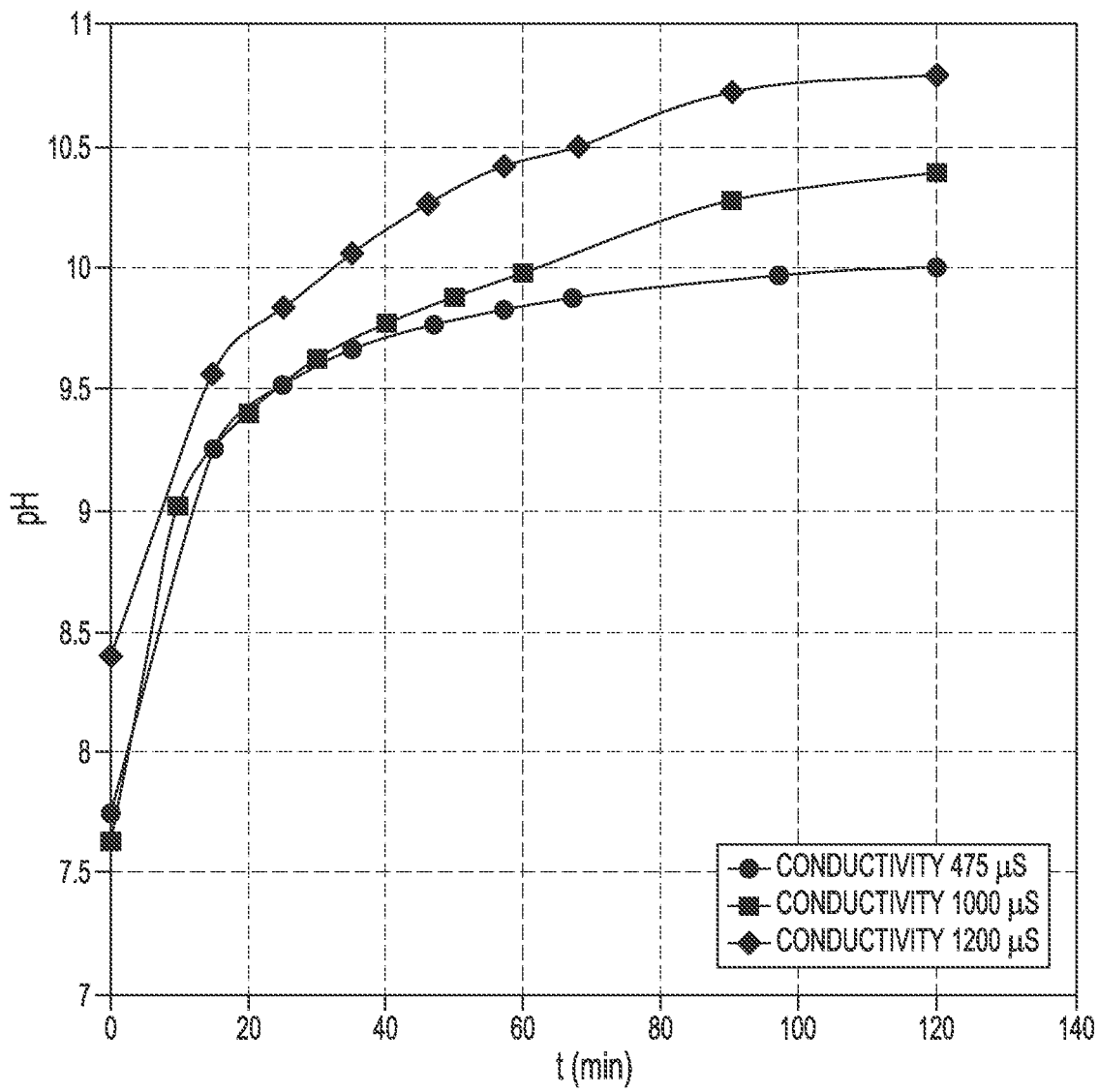
FIG. 5B illustrates electrical current generated by an Mg—Cu cell versus time for solutions having various pH levels, in accordance with various embodiments.

Example 7. Conductivity Effects on Electrical Current Generated by Mg—Cu Cell Versus Time The same experimental conditions as Example 5 were used, without modification of pH, and with modification of conductivity using NaCl. FIG. 5A shows the variation of the electric current that circulates in the Galvanic pair of Mg—Cu as a function of the water conductivity of a local freshwater holding pond. The increase of the conductivity of the water produces remarkable increases in the electric current of the electrochemical cell. The effect of this increase in conductivity in the kinetics of chemical reactions is shown in FIG. 5B, where it improves the kinetics of the pH increase.

Example 8. Mg—Cu Cell, Initial P Concentration 0.392-0.451

Two bodies of water from treatment plants were compared; the water collected from a coastal waste-water treatment plant (WWTP) has three times more conductivity than the water from an inland WWTP due to salt water inclusion in the processing system. The higher conductivity favors the reaction kinetics and thus for the same residence time a greater phosphorus removal occurs in the higher conductivity water while consuming the same amount of sacrificial anode (resulting in the same amount of magnesium ions in solution) as with the lower conductivity. The Mg—Cu cell was medium-sized. The results are shown in Table 5.

TABLE 5

Mg-Cu cell, initial P concentration 0.392-0.451. Cell size = medium.

|  | Inland WWTP | Coastal WWTP |
| --- | --- | --- |
| Flow Rate (mL/min) | 370 | 370 |
| Residence Time (mins) | 50 | 50 |
| Electrodes | 8 | 8 |
| Initial pH | 7.69 | 9.06 |
| Final pH | 10.90 | 10.94 |
| Initial Conductivity (uS) | 960 | 3100 |
| Final Conductivity (uS) | 1124 | 3148 |
| Initial reactive-P (ppm) | 0.451 | 0.392 |
| Final reactive-P (ppm) | 0.122 | 0.061 |
| % P removal | 72.9 | 84.4 |
| Initial dissolved Magnesium (ppm) | 17 | 56 |
| Final dissolved Magnesium (ppm) | 44 | 95 |

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Exemplary Embodiments

The following exemplary embodiments are provided, the numbering of which is not to be construed as designating levels of importance:

Embodiment 1 provides a method of removing phosphorus from water, the method comprising:
immersing an electrochemical cell in water comprising phosphorus to form treated water comprising a salt that comprises the phosphorus, the electrochemical cell comprising
 an anode comprising Mg, Al, Fe, Zn, or a combination thereof,
 a cathode having a different composition than the anode, the cathode comprising Cu, Ni, Fe, or a combination thereof, and
separating the salt comprising the phosphorus from the treated water, to form separated water having a lower phosphorus concentration than the water comprising phosphorus.

Embodiment 2 provides the method of Embodiment 1, wherein the anode and the cathode directly contact one another.

Embodiment 3 provides the method of any one of Embodiments 1-2, wherein the electrochemical cell further comprises a conductive connector that electrically connects the anode and the cathode, the conductive connector comprising Cu, Zn, Fe, Cd, Ni, Sn, Pb, or a combination thereof.

Embodiment 4 provides the method of any one of Embodiments 1-3, wherein the electrochemical cell is a galvanic cell.

Embodiment 5 provides the method of any one of Embodiments 1-4, wherein no electrical potential is applied across the anode and the cathode of the electrochemical cell.

Embodiment 6 provides the method of any one of Embodiments 1-5, wherein the electrochemical cell is an electrolytic cell.

Embodiment 7 provides the method of any one of Embodiments 1-6, comprising applying an electrical potential across the anode and the cathode of the electrochemical cell.

Embodiment 8 provides the method of any one of Embodiments 1-7, comprising applying an electrical potential across the anode and the cathode that is greater than the galvanic corrosion potential of the electrochemical cell.

Embodiment 9 provides the method of any one of Embodiments 1-8, comprising applying an electrical potential across the anode and the cathode that is less than the galvanic corrosion potential of the electrochemical cell.

Embodiment 10 provides the method of any one of Embodiments 1-9, wherein an electrical potential across the anode and the cathode is equal to the galvanic corrosion potential of the electrochemical cell.

Embodiment 11 provides the method of any one of Embodiments 1-10, wherein the immersing of the electrochemical cell in the water comprising phosphorus comprises partial immersion.

Embodiment 12 provides the method of any one of Embodiments 1-11, wherein the immersing of the electrochemical cell in the water comprising phosphorus comprises complete immersion.

Embodiment 13 provides the method of any one of Embodiments 1-12, wherein the phosphorus in the water comprising the phosphorus is in the form of elemental phosphorus, inorganic phosphorus, organic phosphorus, a dissolved form of phosphorus, a solid form of phosphorus, oxidized phosphorus, or a combination thereof.

Embodiment 14 provides the method of any one of Embodiments 1-13, wherein the water comprising the phosphorus has a total phosphorus concentration of about 0.001 ppm to about 10,000 ppm.

Embodiment 15 provides the method of any one of Embodiments 1-14, wherein the water comprising the phosphorus has a total phosphorus concentration of about 0.01 ppm to about 20 ppm.

Embodiment 16 provides the method of any one of Embodiments 1-15, wherein the separated water has a total phosphorus concentration of about 0 ppm to about 1 ppm.

Embodiment 17 provides the method of any one of Embodiments 1-16, wherein the separated water has a total phosphorus concentration of about 0.0001 ppm to 0.1 ppm.

Embodiment 18 provides the method of any one of Embodiments 1-17, wherein the separated water has a total phosphorus concentration of about 0.0001 ppm to 0.05 ppm.

Embodiment 19 provides the method of any one of Embodiments 1-18, wherein the separated water has a dissolved phosphorus concentration of about 0 ppm to about 1 ppm.

Embodiment 20 provides the method of any one of Embodiments 1-19, wherein the separated water has a dissolved phosphorus concentration of about 0.0001 ppm to 0.1 ppm.

Embodiment 21 provides the method of any one of Embodiments 1-20, wherein the separated water has a dissolved phosphorus concentration of about 0.0001 ppm to 0.05 ppm.

Embodiment 22 provides the method of any one of Embodiments 1-21, wherein the separated water has a total phosphorus concentration that is about 0% to about 70% of the total phosphorus concentration of the water comprising phosphorus.

Embodiment 23 provides the method of any one of Embodiments 1-22, wherein the separated water has a total phosphorus concentration that is about 0% to about 20% of the total phosphorus concentration of the water comprising phosphorus.

Embodiment 24 provides the method of any one of Embodiments 1-23, wherein the separated water has a dissolved phosphorus concentration that is about 0% to about 70% of the dissolved phosphorus concentration of the water comprising phosphorus.

Embodiment 25 provides the method of any one of Embodiments 1-24, wherein the separated water has a dissolved phosphorus concentration that is about 0% to about 20% of the dissolved phosphorus concentration of the water comprising phosphorus.

Embodiment 26 provides the method of any one of Embodiments 1-25, wherein the water comprising the phosphorus has a reactive phosphorus concentration of about 0.001 ppm to about 10,000 ppm.

Embodiment 27 provides the method of any one of Embodiments 1-26, wherein the water comprising the phosphorus has a reactive phosphorus concentration of about 0.01 ppm to about 20 ppm.

Embodiment 28 provides the method of any one of Embodiments 1-27, wherein the separated water has a reactive phosphorus concentration of about 0 ppm to about 1 ppm.

Embodiment 29 provides the method of any one of Embodiments 1-28, wherein the separated water has a reactive phosphorus concentration of about 0.0001 ppm to 0.1 ppm.

Embodiment 30 provides the method of any one of Embodiments 1-29, wherein the separated water has a reactive phosphorus concentration of about 0.0001 ppm to 0.05 ppm.

Embodiment 31 provides the method of any one of Embodiments 1-30, wherein the separated water has a reactive phosphorus concentration that is about 0% to about 20% of the total phosphorus concentration of the water comprising phosphorus.

Embodiment 32 provides the method of any one of Embodiments 1-31, wherein the separated water has a reactive phosphorus concentration that is about 0% to about 70% of the dissolved phosphorus concentration of the water comprising phosphorus.

Embodiment 33 provides the method of any one of Embodiments 1-32, wherein during the immersing of the electrochemical cell in the water comprising phosphorus, the water comprising phosphorus has a pH of about 2 to about 14.

Embodiment 34 provides the method of any one of Embodiments 1-33, wherein during the immersing of the electrochemical cell in the water comprising phosphorus, the water comprising phosphorus has a pH of about 5 to about 11.

Embodiment 35 provides the method of any one of Embodiments 1-34, wherein during the immersing of the electrochemical cell in the water comprising phosphorus, the water comprising phosphorus has a pH of about 5 to about 7.

Embodiment 36 provides the method of any one of Embodiments 1-35, wherein during the immersing of the electrochemical cell in the water comprising phosphorus, the water comprising phosphorus has a pH of about 10 to about 11.

Embodiment 37 provides the method of any one of Embodiments 1-36, further comprising adding acid, base, or a combination thereof to the water comprising phosphorus to adjust the pH thereof.

Embodiment 38 provides the method of Embodiment 37, wherein the acid, base, or combination thereof is added to the water comprising phosphorus before the immersing of the electrochemical cell in the water comprising phosphorus, during the immersing of the electrochemical cell in the water comprising phosphorus, after the immersing of the electrochemical cell in the water comprising phosphorus, or a combination thereof.

Embodiment 39 provides the method of any one of Embodiments 1-38, further comprising recirculating the water comprising phosphorus immersing the electrochemical cell to contact the water comprising phosphorus with the electrochemical cell multiple times.

Embodiment 40 provides the method of any one of Embodiments 1-39, wherein at least some of the salt comprising the phosphorus in the treated water comprises a solid.

Embodiment 41 provides the method of any one of Embodiments 1-40, wherein during the immersion of the electrochemical cell in the water comprising the phosphorus, a solid comprising the phosphorus is formed.

Embodiment 42 provides the method of Embodiment 41, wherein formation of the solid comprising the phosphorus comprises precipitation, flocculation, or a combination thereof.

Embodiment 43 provides the method of any one of Embodiments 1-42, wherein separating the salt comprising the phosphorus from the treated water comprises decantation, settling, filtration, or a combination thereof.

Embodiment 44 provides the method of any one of Embodiments 1-43, further comprising separating the treated water from the electrochemical cell.

Embodiment 45 provides the method of any one of Embodiments 1-44, wherein the anode is a sacrificial anode.

Embodiment 46 provides the method of any one of Embodiments 1-45, wherein the salt comprising the phosphorus comprises a material from the anode.

Embodiment 47 provides the method of any one of Embodiments 1-46, further comprising forming a hydroxide salt comprising a material from the anode during the immersing of the electrochemical cell in the water comprising phosphorus.

Embodiment 48 provides the method of Embodiment 47, wherein the separating of the salt comprising the phosphorus from the treated water further comprises separating the hydroxide salt comprising the material from the anode from the treated water.

Embodiment 49 provides the method of any one of Embodiments 1-48, wherein the water comprising phosphorus further comprises a dissolved transition metal, post-transition metal, metalloid, or a combination thereof, further comprising forming a hydroxide salt comprising the transition metal, post-transition metal, or metalloid during the immersing of the electrochemical cell in the water comprising phosphorus.

Embodiment 50 provides the method of Embodiment 49, wherein the separating of the salt comprising the phosphorus from the treated water further comprises separating the hydroxide salt comprising the transition metal, post-transition metal, or metalloid from the treated water.

Embodiment 51 provides the method of any one of Embodiments 49-50, wherein the transition metal, post-transition metal, or metalloid is Sc, Y, Ti, V, Cr, Mn, Fe, Co, Ni, Cu, Zr, Nb, Mo, Tc, Ru, Rh, Pd, Ag, Hf, Ta, W, Re, Os, Ir, Pt, Au, Rf, Db, Sg, Bh, Hs, Al, Zn, Ga, Cd, In, Sn, Hg, Tl, Pb, Bi, Po, Cn, B, Si, Ge, As, Sb, Te, At, or a combination thereof.

Embodiment 52 provides the method of any one of Embodiments 49-51, wherein the transition metal, post-transition metal, or metalloid is Hg, Fe, Cr, Ni, Zn, Cd, As, or a combination thereof.

Embodiment 53 provides the method of any one of Embodiments 49-52, wherein the separated water has a concentration of the transition metal, post-transition metal, metalloid, or combination thereof, that is about 0% to about 70% of a concentration of the transition metal, post-transition metal, metalloid, or combination thereof, in the water comprising phosphorus.

Embodiment 54 provides the method of any one of Embodiments 49-53, wherein the separated water has a concentration of the transition metal, post-transition metal, metalloid, or combination thereof, that is about 0% to about 20% of a concentration of the transition metal, post-transition metal, metalloid, or combination thereof, in the water comprising phosphorus.

Embodiment 55 provides the method of any one of Embodiments 1-54, comprising forming $H_2$ and $HO^-$ at the anode during the immersing of the electrochemical cell in the water comprising phosphorus.

Embodiment 56 provides the method of any one of Embodiments 1-55, comprising forming $H_2$ and $HO^-$ at the cathode during the immersing of the electrochemical cell in the water comprising phosphorus.

Embodiment 57 provides the method of any one of Embodiments 1-56, comprising forming $H_2O_2$, $HO_2^-$, or a combination thereof at the cathode during the immersing of the electrochemical cell in the water comprising phosphorus.

Embodiment 58 provides the method of any one of Embodiments 1-57, further comprising applying shear to the water comprising phosphorus during the immersing of the electrochemical cell in the water comprising phosphorus.

Embodiment 59 provides the method of Embodiment 58, wherein the shear is sufficient to dislodge at least some bubbles comprising $H_2$ from the surface of the anode, cathode, or a combination thereof.

Embodiment 60 provides the method of any one of Embodiments 58-59, wherein the shear is sufficient to at least partially prevent oxide formation at the surface of the anode.

Embodiment 61 provides the method of any one of Embodiments 58-60, wherein the shear is sufficient to at least partially prevent agglomeration of the salt comprising the phosphorus on the surface of the anode.

Embodiment 62 provides the method of any one of Embodiments 1-61, further comprising applying a mechanical force to the electrochemical cell sufficient to dislodge at least some bubbles comprising $H_2$ from the surface of the anode, cathode, or a combination thereof, at least partially prevent oxide formation at the surface of the anode, at least partially prevent agglomeration of the salt comprising the phosphorus on the surface of the anode, or a combination thereof.

Embodiment 63 provides the method of any one of Embodiments 1-62, wherein the water comprising phosphorus further comprises nitrogen.

Embodiment 64 provides the method of Embodiment 63, wherein the nitrogen in the water comprising phosphorus is in the form of elemental nitrogen, inorganic nitrogen, organic nitrogen, a dissolved form of nitrogen, a solid form of nitrogen, oxidized nitrogen, or a combination thereof.

Embodiment 65 provides the method of any one of Embodiments 63-64, wherein the water comprising the phosphorus has a total nitrogen concentration of about 0.001 ppm to about 20 ppm.

Embodiment 66 provides the method of any one of Embodiments 63-65, wherein the water comprising the phosphorus has a total nitrogen concentration of about 1 ppm to about 5 ppm.

Embodiment 67 provides the method of any one of Embodiments 63-66, wherein the separated water has a total nitrogen concentration of about 0 ppm to about 2 ppm.

Embodiment 68 provides the method of any one of Embodiments 63-67, wherein the separated water has a total nitrogen concentration of about 0 ppm to about 1 ppm.

Embodiment 69 provides the method of any one of Embodiments 63-68, wherein the separated water has a dissolved nitrogen concentration of about 0 ppm to about 2 ppm.

Embodiment 70 provides the method of any one of Embodiments 63-69, wherein the separated water has a dissolved nitrogen concentration of about 0 ppm to about 1 ppm.

Embodiment 71 provides the method of any one of Embodiments 63-70, wherein the separated water has a total nitrogen concentration that is about 0% to about 70% of a total nitrogen concentration of the water comprising phosphorus.

Embodiment 72 provides the method of any one of Embodiments 63-71, wherein the separated water has a total nitrogen concentration that is about 0% to about 30% of a total nitrogen concentration of the water comprising phosphorus.

Embodiment 73 provides the method of any one of Embodiments 63-72, wherein the separated water has a dissolved nitrogen concentration that is about 0% to about 70% of a dissolved nitrogen concentration of the water comprising phosphorus.

Embodiment 74 provides the method of any one of Embodiments 63-73, wherein the separated water has a total nitrogen concentration that is about 0% to about 30% of a dissolved nitrogen concentration of the water comprising phosphorus.

Embodiment 75 provides the method of any one of Embodiments 63-74, further comprising forming $NH_3$, $NH_4^+$, or a combination thereof, at the cathode, wherein the $NH_3$ and $NH_4^+$ comprise the nitrogen from the water comprising phosphorus.

Embodiment 76 provides the method of any one of Embodiments 63-75, further comprising forming a salt comprising the nitrogen during the immersing of the electrochemical cell in the water comprising phosphorus.

Embodiment 77 provides the method of Embodiment 76, wherein the separating of the salt comprising the phosphorus from the treated water further comprises separating the salt comprising the nitrogen from the treated water.

Embodiment 78 provides the method of any one of Embodiments 76-77, wherein the salt comprising the nitrogen comprises $NH_4MgPO_4$ or a hydrate thereof.

Embodiment 79 provides the method of any one of Embodiments 1-78, wherein the cathode comprises Cu.

Embodiment 80 provides the method of any one of Embodiments 1-79, wherein the cathode is substantially free of materials other than Cu.

Embodiment 81 provides the method of any one of Embodiments 1-80, wherein the cathode is about 50 wt % to about 100 wt % Cu.

Embodiment 82 provides the method of any one of Embodiments 1-81, wherein the cathode is about 90 wt % to about 100 wt % Cu.

Embodiment 83 provides the method of any one of Embodiments 1-82, wherein the anode comprises an alloy comprising Mg and Al.

Embodiment 84 provides the method of any one of Embodiments 1-83, wherein Mg and Al are about 50 wt % to about 100 wt % of the anode.

Embodiment 85 provides the method of any one of Embodiments 1-84, wherein the anode is substantially free of materials other than Mg, Mg alloys, and Al.

Embodiment 86 provides the method of any one of Embodiments 1-85, wherein the anode further comprises Ag, Pt, Au, or a combination thereof.

Embodiment 87 provides the method of Embodiment 86, wherein the Ag, Pt, Au, or the combination thereof is about 0.0001 wt % to about 20 wt % of the anode.

Embodiment 88 provides the method of any one of Embodiments 86-87, wherein the Ag, Pt, Au, or the combination thereof is about 0.0001 wt % to about 5 wt % of the anode.

Embodiment 89 provides the method of any one of Embodiments 1-88, wherein the anode comprises Mg.

Embodiment 90 provides the method of Embodiment 89, wherein the anode is substantially free of materials other than Mg or alloys thereof.

Embodiment 91 provides the method of any one of Embodiments 89-90, wherein the anode is about 50 wt % to about 100 wt % Mg or alloys thereof.

Embodiment 92 provides the method of any one of Embodiments 89-91, wherein the anode is about 90 wt % to about 100 wt % Mg or alloys thereof.

Embodiment 93 provides the method of any one of Embodiments 89-92, wherein the cathode comprises Cu.

Embodiment 94 provides the method of any one of Embodiments 89-93, wherein the salt comprising the phosphorus comprises magnesium phosphate, magnesium potassium phosphate, a hydrate thereof, or a combination thereof, wherein the magnesium phosphate or magnesium potassium phosphate comprises Mg from the anode.

Embodiment 95 provides the method of Embodiment 94, wherein the separating of the salt comprising the phosphorus from the treated water further comprises separating the magnesium phosphate from the treated water.

Embodiment 96 provides the method of any one of Embodiments 89-95, wherein the water comprising phosphorus further comprises nitrogen, wherein the salt comprising the phosphorus comprises $NH_4MgPO_4$ or a hydrate thereof, the $NH_4MgPO_4$ comprising the phosphorus and Mg from the anode.

Embodiment 97 provides the method of any one of Embodiments 89-96, further comprising forming $Mg(OH)_2$ comprising Mg from the anode during the immersing of the electrochemical cell in the water comprising phosphorus.

Embodiment 98 provides the method of Embodiment 97, wherein the separating of the salt comprising the phosphorus from the treated water further comprises separating the $Mg(OH)_2$ from the treated water.

Embodiment 99 provides the method of any one of Embodiments 89-98, wherein during the immersing of the electrochemical cell in the water comprising phosphorus, the water comprising phosphorus has a pH of about 9.5 to about 11.5.

Embodiment 100 provides the method of any one of Embodiments 89-99, wherein during the immersing of the electrochemical cell in the water comprising phosphorus, the water comprising phosphorus has a pH of about 10 to about 11.

Embodiment 101 provides the method of any one of Embodiments 89-100, further comprising regulating a rate of introduction of fresh water comprising the phosphorus to the electrochemical cell such that the water comprising the phosphorus that immerses the electrochemical cell is maintained at a pH of about 10 to about 11.

Embodiment 102 provides the method of any one of Embodiments 89-101, further comprising immersing the electrochemical cell in the water comprising the phosphorus until the water comprising the phosphorus reaches a pH of about 10 to about 11, and then regulating a rate of introduction of fresh water comprising the phosphorus to the electrochemical cell such that the water comprising the phosphorus that immerses the electrochemical cell is maintained at a pH of about 10 to about 11.

Embodiment 103 provides the method of any one of Embodiments 1-102, wherein the anode comprises Al.

Embodiment 104 provides the method of Embodiment 103, wherein the anode is substantially free of materials other than Al.

Embodiment 105 provides the method of any one of Embodiments 103-104, wherein the anode is about 50 wt % to about 100 wt % Al.

Embodiment 106 provides the method of any one of Embodiments 103-105, wherein the anode is about 90 wt % to about 100 wt % Al.

Embodiment 107 provides the method of any one of Embodiments 103-106, wherein the cathode comprises Cu.

Embodiment 108 provides the method of any one of Embodiments 103-107, wherein the salt comprising the phosphorus comprises $AlPO_4$ or a hydrate thereof.

Embodiment 109 provides the method of Embodiment 108, wherein the separating of the salt comprising the phosphorus from the treated water further comprises separating the $AlPO_4$ from the treated water.

Embodiment 110 provides the method of any one of Embodiments 103-109, further comprising forming aluminum hydroxide or a hydrate thereof, the aluminum hydroxide comprising Al from the anode during the immersing of the electrochemical cell in the water comprising phosphorus.

Embodiment 111 provides the method of Embodiment 110, wherein the separating of the salt comprising the phosphorus from the treated water further comprises separating the aluminum hydroxide from the treated water.

Embodiment 112 provides the method of any one of Embodiments 103-111, wherein during the immersing of the electrochemical cell in the water comprising the phosphorus, the water comprising phosphorus has a pH of about 4 to about 8.

Embodiment 113 provides the method of any one of Embodiments 103-112, wherein during the immersing of the electrochemical cell in the water comprising the phosphorus, the water comprising phosphorus has a pH of about 5 to about 7.

Embodiment 114 provides the method of any one of Embodiments 103-113, further comprising regulating a rate of introduction of an acid to the water comprising the phosphorus such that the water comprising the phosphorus that immerses the electrochemical cell is maintained at a pH of about 5 to about 7.

Embodiment 115 provides the method of Embodiment 114, wherein the acid is added to the water comprising the phosphorus prior to the immersion of the electrochemical cell in the water comprising the phosphorus, during the immersion of the electrochemical cell in the water comprising the phosphorus, after the immersion of the electrochemical cell in the water comprising the phosphorus, or a combination thereof.

Embodiment 116 provides the method of any one of Embodiments 103-115, wherein the acid comprises sulfuric acid, acetic acid, hydrochloric acid, or a combination thereof.

Embodiment 117 provides the method of any one of Embodiments 103-116, comprising flocculating salts comprising Al from the treated water.

Embodiment 118 provides the method of any one of Embodiments 1-117, wherein the cathode has a work function that is larger than a work function of the anode.

Embodiment 119 provides the method of any one of Embodiments 3-118, wherein the conductive connector has a work function that is between a work function of the anode and a work function of the cathode.

Embodiment 120 provides the method of any one of Embodiments 3-119, wherein the conductive connector comprises Cu.

Embodiment 121 provides the method of any one of Embodiments 3-120, wherein the conductive connector comprises Zn.

Embodiment 122 provides the method of any one of Embodiments 3-121, wherein the conductive connector comprises an alloy comprising Cu and Zn.

Embodiment 123 provides the method of any one of Embodiments 3-122, wherein the conductive connector comprises brass.

Embodiment 124 provides the method of any one of Embodiments 3-123, wherein the conductive connector comprises brass, wherein the conductive connector is substantially free of other materials.

Embodiment 125 provides the method of any one of Embodiments 3-124, wherein the electrochemical cell comprises a plurality of the conductive connectors, each conductive connector independently electrically connecting the anode and cathode.

Embodiment 126 provides the method of Embodiment 125, wherein the plurality of conductive connectors are approximately evenly distributed around a perimeter of the electrochemical cell.

Embodiment 127 provides the method of any one of Embodiments 3-126, wherein the conductive connector comprises a screw, a bolt, a nut, a washer, or a combination thereof.

Embodiment 128 provides the method of any one of Embodiments 3-127, wherein the conductive connector comprises a screw or a bolt.

Embodiment 129 provides the method of any one of Embodiments 1-128, wherein the electrochemical cell comprises a plurality of the cathodes.

Embodiment 130 provides the method of any one of Embodiments 1-129, wherein the electrochemical cell comprises a plurality of the anodes.

Embodiment 131 provides the method of any one of Embodiments 1-130, wherein a ratio of anode surface area to cathode surface area for the electrochemical cell is about 0.1 to about 10.

Embodiment 132 provides the method of any one of Embodiments 1-131, wherein a ratio of anode surface area to cathode surface area for the electrochemical cell is about 0.5 to about 2.

Embodiment 133 provides the method of any one of Embodiments 1-132, wherein the cathode comprises a roughened or etched surface.

Embodiment 134 provides the method of any one of Embodiments 1-133, wherein the conductivity of the water comprising the phosphorus during immersion of the electrochemical cell in the water comprising the phosphorus is about 100 µS to about 1,000,000 µS.

Embodiment 135 provides the method of any one of Embodiments 1-134, wherein the conductivity of the water comprising the phosphorus during immersion of the electrochemical cell in the water comprising the phosphorus is about 300 µS to about 100,000 µS.

Embodiment 136 provides the method of any one of Embodiments 1-135, further comprising regulating conductivity of the water comprising the phosphorus such that the conductivity is about 100 µS to about 1,200 µS.

Embodiment 137 provides the method of Embodiment 136, wherein regulating the conductivity of the water comprising the phosphorus comprises regulating a rate of introduction of fresh water comprising the phosphorus to the electrochemical cell.

Embodiment 138 provides the method of any one of Embodiments 136-137, wherein regulating the conductivity of the water comprising the phosphorus comprises adding one or more salts to the water comprising the phosphorus.

Embodiment 139 provides the method of any one of Embodiments 136-138, wherein the salt is added to the water comprising the phosphorus before immersing the electrochemical cell in the water comprising phosphorus, during the immersion of the electrochemical cell in the water comprising phosphorus, after the immersion of the electrochemical cell in the water comprising phosphorus, or a combination thereof.

Embodiment 140 provides the method of any one of Embodiments 136-139, wherein the one or more salts added to the water comprising phosphorus to regulate the conductivity thereof comprise halogen salts, sodium salts, potassium salts, or a combination thereof.

Embodiment 141 provides the method of any one of Embodiments 136-140, wherein the one or more salts added to the water comprising phosphorus to regulate the conductivity thereof comprise sodium chloride.

Embodiment 142 provides the method of any one of Embodiments 1-141, wherein the electrochemical cell comprises a spacing between a surface of the anode and a surface of the cathode of about 1 mm to about 110 mm.

Embodiment 143 provides the method of Embodiment 142, wherein the electrochemical cell comprises the spacing of about 1 mm to about 110 mm between the cathode and at least about 80% of the total surface area of the anode.

Embodiment 144 provides the method of any one of Embodiments 142-143, wherein the electrochemical cell comprises a spacing between a surface of the anode and a surface of the cathode of about 2 mm to about 30 mm.

Embodiment 145 provides the method of any one of Embodiments 1-144, wherein the water comprising phosphorus is water taken from a source comprising a natural source of water in the environment, drinking water, industrial waste-water, industrial cooling water, or a combination thereof.

Embodiment 146 provides the method of any one of Embodiments 1-145, wherein the water comprising phosphorus is water taken from a source comprising a natural source of water in the environment.

Embodiment 147 provides the method of any one of Embodiments 1-146, wherein the method is free of treating the water comprising the phosphorus with an oxidizer or an oxidative treatment other than any oxidation that occurs due to immersion of the electrochemical cell in the water comprising the phosphorus.

Embodiment 148 provides the method of any one of Embodiments 1-147, further comprising oxidizing phosphorus in the water comprising the phosphorus prior to the immersion of the electrochemical cell in the water comprising phosphorus, during the immersion of the electrochemical cell in the water comprising phosphorus, or a combination thereof.

Embodiment 149 provides the method of Embodiment 148, wherein the immersing of the electrochemical cell in the water comprising the phosphorus is sufficient to oxidize the phosphorus in the water comprising the phosphorus.

Embodiment 150 provides the method of any one of Embodiments 148-149, comprising oxidizing phosphorus in the water comprising the phosphorus prior to the immersion of the electrochemical cell in the water comprising phosphorus.

Embodiment 151 provides the method of Embodiment 150, wherein oxidizing the phosphorus in the water comprising the phosphorus comprises contacting an oxidizer and the water comprising phosphorus to oxidize the phosphorus.

Embodiment 152 provides the method of any one of Embodiments 150-151, wherein an aqueous solution of the oxidizer is added to the water comprising phosphorus.

Embodiment 153 provides the method of any one of Embodiments 150-152, wherein the aqueous solution of the oxidizer has a concentration of the oxidizer of about 0.001 ppm to about 999,999 ppm.

Embodiment 154 provides the method of any one of Embodiments 150-153, wherein the aqueous solution of the oxidizer has a concentration of the oxidizer of about 50,000 ppm to about 140,000 ppm.

Embodiment 155 provides the method of any one of Embodiments 150-154, wherein the oxidizer comprises ferrate, ozone, ferric chloride ($FeCl_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, hydroxide, sulfite, a free radical via decomposition thereof, or a combination thereof.

Embodiment 156 provides the method of any one of Embodiments 150-155, wherein the oxidizer converts substantially all dissolved phosphorus in the water comprising the phosphorus into oxidized forms of phosphorus.

Embodiment 157 provides the method of any one of Embodiments 1-156, further comprising adjusting the pH of the separated water to be about 6 to about 8.

Embodiment 158 provides the method of any one of Embodiments 1-157, further comprising adjusting the pH of the separated water to be about 7.

Embodiment 159 provides the method of any one of Embodiments 1-158, wherein the method is free of pH treatment of the separated water.

Embodiment 160 provides the method of any one of Embodiments 1-159, wherein the method comprises immersing a plurality of the electrochemical cells in the water comprising the phosphorus.

Embodiment 161 provides the method of any one of Embodiments 1-160, wherein the electrochemical cell is planar.

Embodiment 162 provides the method of any one of Embodiments 1-161, wherein the electrochemical cell has a thickness that is less than a height and a width of the electrochemical cell.

Embodiment 163 provides the method of any one of Embodiments 1-162, wherein the cathode comprises a planar frame of the electrochemical cell and a cathode material comprised within a perimeter of the frame, wherein the cathode material is electrically connected to the frame.

Embodiment 164 provides the method of Embodiment 163, wherein the frame is a structural component of the electrochemical cell, the frame comprising the cathode material, wherein the frame is structurally sufficient to maintain its shape in the absence of any of or all of the anodes.

Embodiment 165 provides the method of any one of Embodiments 163-164, wherein the planar frame is nonporous solid material.

Embodiment 166 provides the method of any one of Embodiments 163-165, wherein the planar frame is one or more strips of cathode material.

Embodiment 167 provides the method of any one of Embodiments 163-166, wherein the planar frame has a polygonal perimeter.

Embodiment 168 provides the method of any one of Embodiments 163-167, wherein the planar frame is a square or rectangle.

Embodiment 169 provides the method of any one of Embodiments 163-168, wherein the cathode material comprised within the perimeter of the planar frame comprises a porous cathode material.

Embodiment 170 provides the method of Embodiment 169, wherein the porous cathode material comprises wire, mesh, screen, a sheet comprising one or more through-holes, or a combination thereof.

Embodiment 171 provides the method of Embodiment 170, wherein the porous cathode material comprises a wire mesh or a wire screen comprising the porous cathode material.

Embodiment 172 provides the method of any one of Embodiments 170-171, wherein the electrochemical cell further comprises a conductive connector that electrically connects the anode and the cathode, the conductive connector comprising Cu, Zn, Fe, Cd, Ni, Sn, Pb, or a combination thereof, wherein the porous cathode material comprised within the perimeter of the planar frame has edges that are sandwiched between two of the planar frames, the two planar frames held together to secure the porous cathode material therebetween with one or more of the conductive connectors.

Embodiment 173 provides the method of Embodiment 172, wherein the electrochemical cell comprises a plurality of pairs of the planar frames, each pair held together to secure the porous cathode material therebetween with one or more of the conductive connectors, and each pair separated by one or more of the anodes spanning across the porous cathode material comprised within the perimeter of the planar frame.

Embodiment 174 provides the method of Embodiment 173, wherein the one or more anodes that separate each pair of planar frames from one another directly contact a face of each pair of planar frames separated therewith.

Embodiment 175 provides the method of any one of Embodiments 173-174, wherein the one or more anodes that separate each pair of planar frames from one another directly contact a face of one of each pair of planar frames separated therewith and are free of direct contact with a face of the other of each pair of planar frames separated therewith.

Embodiment 176 provides the method of any one of Embodiments 170-175, wherein the electrochemical cell further comprises a conductive connector that electrically connects the anode and the cathode, the conductive connector comprising Cu, Zn, Fe, Cd, Ni, Sn, Pb, or a combination thereof, wherein the anode is a strip fastened to the planar frame at two edges of the planar frame, wherein the anode is fastened to the planar frame with at least one of the conductive connectors at each of the two edges of the planar frame, such that the anode spans across the cathode material comprised within the perimeter of the planar frame forming a gap between the cathode material comprised within the perimeter of the planar frame and the anode strip.

Embodiment 177 provides the method of Embodiment 176, wherein the anode and the cathode directly contact one another at each of the edges of the planar frame where the anode is fastened to the planar frame via the at least one conductive connector.

Embodiment 178 provides the method of any one of Embodiments 170-177, wherein the electrochemical cell further comprises a conductive connector that electrically connects the anode and the cathode, the conductive connector comprising Cu, Zn, Fe, Cd, Ni, Sn, Pb, or a combination thereof, wherein the electrochemical cell comprises a plurality of the anodes, wherein each anode is a strip fastened to the planar frame at two edges of the planar frame on a face of the frame, wherein each of the anodes is fastened to the planar frame with at least one of the conductive connectors at each of the two edges of the planar frame, such that each of the anodes spans across the cathode material comprised within the perimeter of the planar frame forming a gap between the cathode material comprised within the perimeter of the planar frame and the anode strip, wherein the plurality of the anodes are spaced-apart across the face of the such that they do not physically contact one another.

Embodiment 179 provides the method of Embodiment 178, wherein each of the anodes spans across the cathode material comprised within the perimeter of the planar frame approximately parallel to one another on the face.

Embodiment 180 provides the method of any one of Embodiments 178-179, wherein the two edges of the planar frame to which are fastened each anode are opposite edges of the planar frame.

Embodiment 181 provides the method of any one of Embodiments 178-180, wherein all of the anodes are on a single major face of the planar frame.

Embodiment 182 provides the method of any one of Embodiments 178-181, wherein some of the anodes are on one major face of the planar frame, and the other anodes are on another major face of the frame.

Embodiment 183 provides the method of any one of Embodiments 3-182, wherein the electrochemical cell comprises the cathode, wherein the cathode comprises a planar frame of the electrochemical cell having a polygonal perimeter and a porous material comprised within the perimeter of the frame that is a wire mesh or a wire screen that is in direct contact with the frame; a plurality of the anodes, wherein each anode is a strip fastened to the planar frame at two opposite edges of the planar frame on a face of the planar frame, wherein each of the anodes is fastened to the planar frame with at least one of the conductive connectors at each of the two edges of the planar frame, such that each of the anodes are approximately parallel to one another and span across the porous material comprised within the perimeter of the planar frame forming a gap between the porous material comprised within the perimeter of the planar frame and the anode strip, wherein each anode directly contacts the cathode frame at each of the edges of the planar frame where the anode is fastened to the planar frame via the at least one conductive connector, wherein the plurality of the anodes are spaced-apart across the face of the such that they do not physically contact one another, and wherein the gap is about 1 mm to about 110 mm.

Embodiment 184 provides the method of any one of Embodiments 1-183, comprising
immersing one or more of the electrochemical cells in an enclosure comprising the water comprising the phosphorus;
filtering the salt comprising the phosphorus from the treated water via one of more filters that are at least partially submerged in the water comprising the phosphorus that immerses the electrochemical cells.

Embodiment 185 provides the method of Embodiment 184, wherein the filter comprises a glass frit, a fabric filter, a paper filter, a disk filter, a rotary filter, a drum filter, a screen, a sieve, particulate filtration media, a filter aid, or a combination thereof.

Embodiment 186 provides the method of any one of Embodiments 184-185, wherein the filter is a rotating disk filter.

Embodiment 187 provides the method of any one of Embodiments 184-186, wherein the filtering comprises forming a filter cake on the filter, the filter cake comprising the salt comprising the phosphorus.

Embodiment 188 provides the method of Embodiment 187, further comprising backwashing the filter to remove the filter cake from the filter and to form a backwash liquor that comprises the removed filter cake.

Embodiment 189 provides the method of Embodiment 188, wherein a portion of the water comprising the precipitate is used to backwash the filter.

Embodiment 190 provides the method of any one of Embodiments 184-189, wherein the one or more electrochemical cells are positioned in the water comprising the phosphorus at side portions of the enclosure, wherein the filter is positioned approximately in a central portion of the enclosure in the water comprising the phosphorus such that the filter is in-between the plurality of electrochemical cells.

Embodiment 191 provides the method of any one of Embodiments 184-190, comprising a plurality of the filters.

Embodiment 192 provides the method of Embodiment 191, wherein the one or more filters comprise a plurality of rotating disk filters.

Embodiment 193 provides a method of removing phosphorus from water, the method comprising:
immersing an electrochemical cell in water comprising phosphorus having a pH of about 5 to about 7 to form treated water comprising a salt that comprises the phosphorus, the salt comprising
$AlPO_4$ or a hydrate thereof, the $AlPO_4$ comprising the phosphorus and Al from the anode,
aluminum hydroxide or a hydrate thereof, the aluminum hydroxide comprising Al from the anode, or
a combination thereof,
the electrochemical cell comprising
an anode comprising Al, wherein the anode is about 90 wt % to about 100 wt % Al,
a cathode comprising Cu, wherein the cathode is about 90 wt % to about 100 wt % Cu, and
a conductive connector that electrically connects the anode and the cathode, the conductive connector comprising an alloy comprising Cu and Zn; and
separating the salt comprising the phosphorus from the treated water, to form separated water having a lower phosphorus concentration than the water comprising phosphorus.

Embodiment 194 provides a method of removing phosphorus from water, the method comprising:
immersing an electrochemical cell in water comprising phosphorus having a pH of about 10 to about 11 to form treated water comprising a salt that comprises the phosphorus, the salt comprising
magnesium phosphate, magnesium potassium phosphate, a hydrate thereof, or a combination thereof,
$NH_4MgPO_4$ or a hydrate thereof, the $NH_4MgPO_4$ comprising the phosphorus and Mg from the anode,
$Mg(OH)_2$ comprising Mg from the anode, or
a combination thereof,
the electrochemical cell comprising
an anode comprising Mg, wherein the anode is about 90 wt % to about 100 wt % Mg,
a cathode comprising Cu, wherein the cathode is about 90 wt % to about 100 wt % Cu, and
a conductive connector that electrically connects the anode and the cathode, the conductive connector comprising an alloy comprising Cu and Zn; and
separating the salt comprising the phosphorus from the treated water, to form separated water having a lower phosphorus concentration than the water comprising phosphorus.

Embodiment 195 provides an electrochemical cell for performing the method of any one of Embodiments 1-194, the electrochemical cell comprising:
a cathode comprising Cu, Ni, Fe, or a combination thereof, wherein the cathode comprises a planar frame of the electrochemical cell having a polygonal perimeter and a porous material comprised within the perimeter of the frame that is a wire mesh or a wire screen that is in direct contact with the frame; and
a plurality of anodes comprising Mg, Al, Fe, Zn, or a combination thereof, and a plurality of conductive connectors that electrically connect the anode and the cathode, the conductive connector comprising Cu, Zn, Fe, Cd, Ni, Sn, Pb, or a combination thereof,
wherein each anode is a strip fastened to the planar frame at two opposite edges of the planar frame on a face of the frame, wherein each of the anodes is fastened to the planar frame with at least one of the conductive connectors at each of the two edges of the planar frame, such that each of the anodes on the face are approximately parallel to one another on the face and span across the porous material comprised within the perimeter of the planar frame forming a gap between the porous material comprised within the perimeter of the planar frame and the anode strip, wherein each anode directly contacts the cathode frame at each of the edges of the planar frame where the anode is fastened to the planar frame via the at least one conductive connector, wherein the plurality of the anodes are spaced-apart across the face of the such that they do not physically contact one another, and wherein the gap is about 1 mm to about 110 mm.

Embodiment 196 provides a method of making struvite, the method comprising:
immersing an electrochemical cell in water comprising phosphorus having a pH of about 10 to about 11 to form treated water comprising a salt that comprises the phosphorus, the salt comprising struvite, the struvite comprising the phosphorus and Mg from the anode, the electrochemical cell comprising
- an anode comprising Mg, wherein the anode is about 90 wt % to about 100 wt % Mg,
- a cathode comprising Cu, wherein the cathode is about 90 wt % to about 100 wt % Cu; and
- separating the salt comprising the phosphorus from the treated water to obtain separated struvite and to form separated water having a lower phosphorus concentration than the water comprising phosphorus.

Embodiment 197 provides the method of Embodiment 196, wherein the electrochemical cell further comprises a conductive connector that electrically connects the anode and the cathode, the conductive connector comprising Cu, Zn, Fe, Cd, Ni, Sn, Pb, or a combination thereof.

Embodiment 198 provides the method of any one of Embodiments 196-197, wherein the anode and the cathode directly contact one another.

Embodiment 199 provides the method of any one of Embodiments 196-198, further comprising purifying the separated struvite.

Embodiment 200 provides the method of any one of Embodiments 196-199, wherein the water comprising the phosphorus further comprises nitrogen.

Embodiment 201 provides the method of Embodiment 200, further comprising adding the nitrogen to the water comprising the phosphorus.

Embodiment 202 provides the method of Embodiment 201, wherein the nitrogen added to the water comprising the phosphorus is added as $KNO_3$, $HNO_3$, an organic nitrogen compound, or a combination thereof.

Embodiment 203 provides the method of any one of Embodiments 196-202, further comprising adding phosphorus to water to form the water comprising the phosphorus.

Embodiment 204 provides a method of making $APO_4$, aluminum hydroxide, or a combination thereof, the method comprising:
immersing an electrochemical cell in water comprising phosphorus having a pH of about 5 to about 7 to form treated water comprising a salt that comprises the phosphorus, the salt comprising
- $AlPO_4$ or a hydrate thereof, the $AlPO_4$ comprising the phosphorus and Al from the anode,
- aluminum hydroxide or a hydrate thereof, the aluminum hydroxide comprising Al from the anode, or
- a combination thereof,
the electrochemical cell comprising
- an anode comprising Al, wherein the anode is about 90 wt % to about 100 wt % Al,
- a cathode comprising Cu, wherein the cathode is about 90 wt % to about 100 wt % Cu; and
- separating the salt comprising the phosphorus from the treated water, to form separated water having a lower phosphorus concentration than the water comprising phosphorus.

Embodiment 205 provides the method of Embodiment 204, wherein the electrochemical cell further comprises a conductive connector that electrically connects the anode and the cathode, the conductive connector comprising Cu, Zn, Fe, Cd, Ni, Sn, Pb, or a combination thereof.

Embodiment 206 provides the method of any one of Embodiments 204-205, wherein the anode and the cathode directly contact one another.

Embodiment 207 provides the method of any one of Embodiments 204-206, further comprising adding phosphorus to water to form the water comprising the phosphorus.

Embodiment 208 provides the method of any one of Embodiments 204-207, further comprising purifying the salt comprising the phosphorus, to provide purified $AlPO_4$, purified aluminum hydroxide, or a purified mixture of $AlPO_4$ and aluminum hydroxide.

Embodiment 209 provides a method of making magnesium phosphate, $Mg(OH)_2$, or a combination thereof, the method comprising:
immersing an electrochemical cell in water comprising phosphorus having a pH of about 10 to about 11 to form treated water comprising a salt that comprises the phosphorus, the salt comprising
- magnesium phosphate, magnesium potassium phosphate, a hydrate thereof, or a combination thereof,
- $Mg(OH)_2$ comprising Mg from the anode, or
- a combination thereof,
the electrochemical cell comprising
- an anode comprising Mg, wherein the anode is about 90 wt % to about 100 wt % Mg,
- a cathode comprising Cu, wherein the cathode is about 90 wt % to about 100 wt % Cu; and
- separating the salt comprising the phosphorus from the treated water, to form separated water having a lower phosphorus concentration than the water comprising phosphorus.

Embodiment 210 provides the method of Embodiment 209, wherein the electrochemical cell further comprises a conductive connector that electrically connects the anode and the cathode, the conductive connector comprising Cu, Zn, Fe, Cd, Ni, Sn, Pb, or a combination thereof.

Embodiment 211 provides the method of any one of Embodiments 209-210, wherein the anode and the cathode directly contact one another.

Embodiment 212 provides the method of any one of Embodiments 209-211, further comprising adding phosphorus to water to form the water comprising phosphorus.

Embodiment 213 provides the method of any one of Embodiments 209-212, further comprising purifying the salt comprising the phosphorus, to provide purified magnesium phosphate, purified $Mg(OH)_2$, or a purified mixture of magnesium phosphate and $Mg(OH)_2$.

Embodiment 214 provides a method of removing one or more dissolved transition metals, post-transition metals, or metalloids from water, the method comprising:
immersing an electrochemical cell in water comprising the one or more dissolved transition metals, post-transition metals, or metalloids to form treated water comprising a hydroxide salt that comprises the one or more transition metals, post-transition metals, or metalloids, the electrochemical cell comprising
- an anode comprising Mg, Al, Fe, Zn, or a combination thereof,
- a cathode having a different composition than the anode, the cathode comprising Cu, Ni, Fe, or a combination thereof, and
- separating the salt comprising the hydroxide salt that comprises the one or more transition metals, post-transition metals, or metalloids, to form separated water having a lower concentration of the one or more transition metals, post-transition metals, or metalloids than the water comprising the one or more transition metals, post-transition metals, or metalloids.

Embodiment 215 provides the method of Embodiment 214, wherein the electrochemical cell further comprises a conductive connector that electrically connects the anode and the cathode, the conductive connector comprising Cu, Zn, Fe, Cd, Ni, Sn, Pb, or a combination thereof.

Embodiment 216 provides the method of any one of Embodiments 214-215, wherein the anode and the cathode directly contact one another.

Embodiment 217 provides the method of any one of Embodiments 214-215, wherein the one or more transition metals, post-transition metals, or metalloids comprise Sc, Y, Ti, V, Cr, Mn, Fe, Co, Ni, Cu, Zr, Nb, Mo, Tc, Ru, Rh, Pd, Ag, Hf, Ta, W, Re, Os, Ir, Pt, Au, Rf, Db, Sg, Bh, Hs, Al, Zn, Ga, Cd, In, Sn, Hg, Tl, Pb, Bi, Po, Cn, B, Si, Ge, As, Sb, Te, At, or a combination thereof.

Embodiment 218 provides the method of any one of Embodiments 214-216, wherein the one or more transition metals, post-transition metals, or metalloids comprise Hg, Fe, Cr, Ni, Zn, Cd, As, or a combination thereof.

Embodiment 219 provides the method of any one of Embodiments 214-217, wherein the separated water has a concentration of the transition metal, post-transition metal, metalloid, or combination thereof, that is about 0% to about 70% of a concentration of the transition metal, post-transition metal, metalloid, or combination thereof, in the water comprising the one or more dissolved transition metals, post-transition metals, or metalloids.

Embodiment 220 provides the method of any one of Embodiments 214-218, wherein the separated water has a concentration of the transition metal, post-transition metal, metalloid, or combination thereof, that is about 0% to about 20% of a concentration of the transition metal, post-transition metal, metalloid, or combination thereof, in the water comprising the one or more dissolved transition metals, post-transition metals, or metalloids.

Embodiment 219 provides the method or electrochemical cell of any one or any combination of Embodiments 1-218 optionally configured such that all elements or options recited are available to use or select from.

What is claimed is:

1. A method of removing phosphorus from water, the method comprising:
   immersing an electrochemical cell in water comprising phosphorus to form treated water comprising a salt that comprises the phosphorus, wherein the electrochemical cell is a galvanic cell, the electrochemical cell comprising
   an anode comprising Al,
   a cathode having a different composition than the anode, the cathode comprising Cu, wherein the cathode comprises a planar frame of the electrochemical cell and a cathode material comprised within a perimeter of the frame, wherein the cathode material is electrically connected to the frame, wherein the cathode material comprised within the perimeter of the planar frame comprises a porous cathode material, and
   a conductive connector that electrically connects the anode and the cathode, the conductive connector comprising Cu, Zn, Fe, Cd, Ni, Sn, Pb, or a combination thereof, wherein the conductive connector comprises a screw, a bolt, or a combination thereof; and
   separating the salt comprising the phosphorus from the treated water, to form separated water having a lower phosphorus concentration than the water comprising phosphorus.

2. The method of claim 1, wherein the anode and the cathode directly contact one another.

3. The method of claim 1, wherein the conductive connector comprises an alloy comprising Cu and Zn.

4. The method of claim 1, wherein the conductive connector comprises brass.

5. The method of claim 1, wherein the separated water
   has a total phosphorus concentration that is 0% to 20% of the total phosphorus concentration of the water comprising phosphorus, or
   has a dissolved phosphorus concentration that is 0% to 20% of the dissolved phosphorus concentration of the water comprising phosphorus, or
   has a reactive phosphorus concentration that is 0% to 20% of the total phosphorus concentration of the water comprising phosphorus, or
   has a total nitrogen concentration that is 0% to 30% of a total nitrogen concentration of the water comprising phosphorus, or
   has a total nitrogen concentration that is 0% to 30% of a dissolved nitrogen concentration of the water comprising phosphorus, or
   a combination thereof.

6. The method of claim 1, wherein the salt comprising the phosphorus comprises a material from the anode.

7. The method of claim 1, wherein the water comprising phosphorus further comprises a dissolved transition metal, post-transition metal, metalloid, or a combination thereof, further comprising forming a hydroxide salt comprising the transition metal, post-transition metal, or metalloid during the immersing of the electrochemical cell in the water comprising phosphorus, wherein the separating of the salt comprising the phosphorus from the treated water further comprises separating the hydroxide salt comprising the transition metal, post-transition metal, or metalloid from the treated water.

8. The method of claim 1, further comprising applying mechanical force to the electrochemical cell during the immersing of the electrochemical cell in the water comprising phosphorus, or applying shear to the water comprising phosphorus during the immersing of the electrochemical cell in the water comprising phosphorus, or a combination thereof, wherein the mechanical force and/or shear is sufficient to
   dislodge at least some bubbles comprising $H_2$ from the surface of the anode, cathode, or a combination thereof, or
   at least partially prevent oxide formation at the surface of the anode, or
   at least partially prevent agglomeration of the salt comprising the phosphorus on the surface of the anode, or
   a combination thereof.

9. The method of claim 1, comprising
   immersing the electrochemical cell or a plurality thereof in an enclosure comprising the water comprising the phosphorus; and
   filtering the salt comprising the phosphorus from the treated water via one of more filters that are at least partially submerged in the water comprising the phosphorus that immerses the electrochemical cells.

10. The method of claim 1, wherein the electrochemical cell comprises:
    the planar frame, wherein the planar frame comprises a polygonal perimeter;
    the porous cathode material, wherein the porous cathode material comprises a wire mesh or a wire screen that is in direct contact with the frame; and
    a plurality of anodes that are each the anode comprising Al, and a plurality of the conductive connectors that electrically connect each of the anodes and the cathode;

wherein each of the anodes is a strip fastened to the planar frame at two opposite edges of the planar frame on a face of the frame, wherein each of the anodes is fastened to the planar frame with at least one of the conductive connectors at each of the two edges of the planar frame, such that each of the anodes on the face are approximately parallel to one another on the face and span across the porous material comprised within the perimeter of the planar frame forming a gap between the porous material comprised within the perimeter of the planar frame and the anode strip, wherein each of the anodes directly contacts the cathode frame at each of the edges of the planar frame, wherein the plurality of the anodes are spaced-apart across the face of the frame such that they do not physically contact one another, and wherein the gap is about 1 mm to about 110 mm.

11. The method of claim 1, wherein the method is a method of making $AlPO_4$, aluminum hydroxide, or a combination thereof, wherein:
the water comprising phosphorus has a pH of about 5 to about 7;
the salt comprising the phosphorus comprises
$AlPO_4$ or a hydrate thereof, the $AlPO_4$ comprising the phosphorus and Al from the anode, or
aluminum hydroxide or a hydrate thereof, the aluminum hydroxide comprising Al from the anode, or
a combination thereof;
the anode is about 90 wt % to about 100 wt % Al;
the cathode is about 90 wt % to about 100 wt % Cu; and
separating the salt comprising the phosphorus from the treated water provides separated $AlPO_4$, aluminum hydroxide, or a combination thereof.

12. A method of removing phosphorus froth water, the method comprising:
immersing an electrochemical cell in water comprising phosphorus having a pH of about 5 to about 7 to form treated water comprising a salt that comprises the phosphorus, wherein the electrochemical cell is a galvanic cell, the salt comprising
$AlPO_4$ or a hydrate thereof, the AIM comprising the phosphorus and Al from the anode,
aluminum hydroxide or a hydrate thereof, the aluminum hydroxide comprising Al from the anode, or
a combination thereof,
the electrochemical cell comprising
an anode comprising Al, wherein the anode is about 90 wt % to about 100 wt % Al,
a cathode comprising Cu, wherein the cathode is about 90 wt % to about 100 wt % Cu, wherein the cathode comprises a planar frame of the electrochemical cell and a cathode material comprised within a perimeter of the frame, wherein the cathode material is electrically connected to the frame, wherein the cathode material comprised within the perimeter of the planar frame comprises a porous cathode material, and
a conductive connector that electrically connects the anode and the cathode, the conductive connector comprising an alloy comprising Cu and Zn, wherein the conductive connector comprises a screw, a bolt, or a combination thereof; and
separating the salt comprising the phosphorus from the treated water, to form separated water having a lower phosphorus concentration than the water comprising phosphorus.

13. A method of removing phosphorus from water, the method comprising:
immersing an electrochemical cell in water comprising phosphorus to form treated water comprising a salt that comprises the phosphorus, the electrochemical cell comprising
an anode comprising Mg, Al, Fe, Zn, or a combination thereof,
a cathode having a different composition than the anode, the cathode comprising Cu, Ni, Fe, or a combination thereof; and
separating the salt comprising the phosphorus from the treated water, to form separated water having a lower phosphorus concentration than the water comprising phosphorus;
wherein the electrochemical cell comprises
the cathode comprising Cu, Ni, Fe, or a combination thereof, wherein the cathode comprises a planar frame of the electrochemical cell having a polygonal perimeter and a porous material comprised within the perimeter of the frame that is a wire mesh or a wire screen that is in direct contact with the frame, and
a plurality of anodes that are each the anode comprising Mg, Al, Fe, Zn, or a combination thereof, and a plurality of conductive connectors that electrically connect each of the anodes and the cathode, each of the conductive connectors comprising Cu, Zn, Fe; Cd, Ni, Sn, Pb, or a combination thereof,
wherein each of the anodes is a strip fastened to the planar frame at two opposite edges of the planar frame on a face of the frame, wherein each of the anodes is fastened to the planar frame with at least one of the conductive connectors at each of the two edges of the planar frame, such that each of the anodes on the face are approximately parallel to one another on the face and span across the porous material comprised within the perimeter of the planar frame forming a gap between the porous material comprised within the perimeter of the planar frame and the anode strip, wherein each of the anodes directly contacts the cathode frame at each of the edges of the planar frame, wherein the plurality of the anodes are spaced-apart across the face of the such that they do not physically contact one another, and wherein the gap is about 1 mm to about 110 mm.

14. A method of removing phosphorus from water, the method comprising:
immersing an electrochemical cell in water comprising phosphorus to form treated water comprising a salt that comprises the phosphorus, wherein the electrochemical cell is a galvanic cell, the electrochemical cell comprising
a plurality of anodes in the form of strips, each of the anodes comprising Al,
a cathode having a different composition than the anode, the cathode comprising Cu, and
a plurality of conductive connectors, each of the conductive connectors comprising Cu Zn Fe, Cd, Ni, Sn, Pb, or a combination thereof, wherein each of the conductive connectors comprises a screw, a bolt, or a combination thereof, and wherein each anode is fastened to and electrically connected to the cathode via at least one of the conductive connectors; and
separating the salt comprising the phosphorus from the treated water, to form separated water having a lower phosphorus concentration than the water comprising phosphorus.

* * * * *

UNITED STATES PATENT AND TRADEMARK OFFICE
CERTIFICATE OF CORRECTION

PATENT NO. : 11,225,420 B2
APPLICATION NO. : 17/249343
DATED : January 18, 2022
INVENTOR(S) : Borras et al.

Page 1 of 1

It is certified that error appears in the above-identified patent and that said Letters Patent is hereby corrected as shown below:

On the Title Page

On page 2, in Column 2, item (56) under "Other Publications", Line 36, delete "Applictions" and insert --Applications-- therefor In the Specification In Column 17, Line 53, delete "1)." and insert --1B).-- therefor In Column 19, Line 31, delete "thereof," and insert --thereof;-- therefor In Column 26, Line 17, delete "(uS)" and insert --(µS)-- therefor In Column 26, Line 18, delete "(uS)" and insert --(µS)-- therefor In Column 26, Line 55, delete "thereof," and insert --thereof;-- therefor In Column 40, Line 46, delete "thereof," and insert --thereof;-- therefor In Column 41, Line 36, delete "APO$_4$," and insert --AlPO$_4$,-- therefor In the Claims In Column 45, Line 36, in Claim 12, delete "froth" and insert --from-- therefor In Column 45, Line 43, in Claim 12, delete "AIM" and insert --AlPO$_4$-- therefor In Column 46, Line 27, in Claim 13, delete "Fe;" and insert --Fe,-- therefor In Column 46, Line 57, in Claim 14, delete "Cu Zn" and insert --Cu, Zn,-- therefor Signed and Sealed this
Twenty-fourth Day of May, 2022

*Katherine Kelly Vidal*

Katherine Kelly Vidal
*Director of the United States Patent and Trademark Office*